United States Patent
Nishibayashi et al.

(10) Patent No.: US 7,495,046 B2
(45) Date of Patent: Feb. 24, 2009

(54) CROSSLINKABLE ELASTOMER COMPOSITION AND FORMED PRODUCT COMPRISING THE SAME

(75) Inventors: Hirofumi Nishibayashi, Settsu (JP); Takafumi Yamato, Settsu (JP); Katsuhiko Higashino, Settsu (JP); Hiroyuki Tanaka, Settsu (JP); Tsuyoshi Noguchi, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 303 days.

(21) Appl. No.: 10/498,939

(22) PCT Filed: Dec. 13, 2002

(86) PCT No.: PCT/JP02/13048

§ 371 (c)(1),
(2), (4) Date: Nov. 18, 2004

(87) PCT Pub. No.: WO03/051999

PCT Pub. Date: Jun. 26, 2003

(65) Prior Publication Data

US 2005/0070637 A1 Mar. 31, 2005

(30) Foreign Application Priority Data

Dec. 17, 2001 (JP) .............................. 2001-382996
Sep. 2, 2002 (JP) .............................. 2002-256724

(51) Int. Cl.
*C08L 1/00* (2006.01)
(52) U.S. Cl. .................. 524/80; 524/401; 524/500; 524/544; 524/860
(58) Field of Classification Search .................. 524/80, 524/401, 544, 860, 500
See application file for complete search history.

(56) References Cited

U.S. PATENT DOCUMENTS 4,584,336 A 4/1986 Pate et al.
4,585,822 A 4/1986 Streusand (Continued)

FOREIGN PATENT DOCUMENTS

FR 2 715 407 7/1995

(Continued)

OTHER PUBLICATIONS

International Search Report for PCT/JP02/13048 dated Apr. 1, 2003.

(Continued)

*Primary Examiner*—Peter D. Mulcahy
*Assistant Examiner*—Henry Hu
(74) *Attorney, Agent, or Firm*—Sughrue Mion, PLLC

(57) ABSTRACT

The present invention provides a crosslinkable elastomer composition, in which generation of HF under high temperature conditions is reduced, the decrease in weight to both $NF_3$ plasma treatment and $O_3$ treatment in the semiconductor manufacturing process is small and generation of foreign substances (particles) in these treatments is suppressed significantly. Specifically, the present invention relates to a crosslinkable elastomer composition comprising a crosslinkable elastomer and a filler having a specific surface area of at least 0.5 $m^2$/g and containing a synthetic polymer having a thermally and chemically stable aromatic ring in the main chain, a crosslinkable elastomer composition comprising a crosslinkable elastomer and nonoxide ceramics and a crosslinkable elastomer composition wherein the decrease in weight by $NF_3$ plasma irradiation is at most 0.20%.

15 Claims, 1 Drawing Sheet

U.S. PATENT DOCUMENTS

| | | | | |
|---|---|---|---|---|
| 4,663,415 | A | * 5/1987 | Grogler et al. | 528/61 |
| 5,691,407 | A | * 11/1997 | Azechi et al. | 524/437 |
| 6,239,378 | B1 | * 5/2001 | Shephard | 174/110 S |
| 6,531,568 | B1 | * 3/2003 | Shibuya et al. | 528/170 |

FOREIGN PATENT DOCUMENTS

| | | | |
|---|---|---|---|
| JP | 03-239389 A | | 10/1991 |
| JP | 06-013495 A | | 1/1994 |
| JP | 2000-309074 | * | 11/2000 |
| JP | 2000-309704 A | * | 11/2000 |
| JP | 2001-11272 | * | 1/2001 |
| JP | 2001-011272 A | * | 1/2001 |
| JP | 2001-11272 A | | 1/2001 |
| JP | 2002-012705 A | * | 1/2002 |
| JP | 2002-12705 A | | 1/2002 |
| WO | WO-00/64980 | * | 11/2000 |
| WO | WO-01/20618 A1 | * | 3/2001 |
| WO | WO 01/20618 A1 | | 3/2001 |
| WO | WO-03/051999 A1 | * | 6/2003 |

OTHER PUBLICATIONS

English translation of International Preliminary Examination Report for PCT/JP2002/013048 dated Mar. 2, 2004.

Japanese Office Action dated Jul. 22, 2008.

* cited by examiner

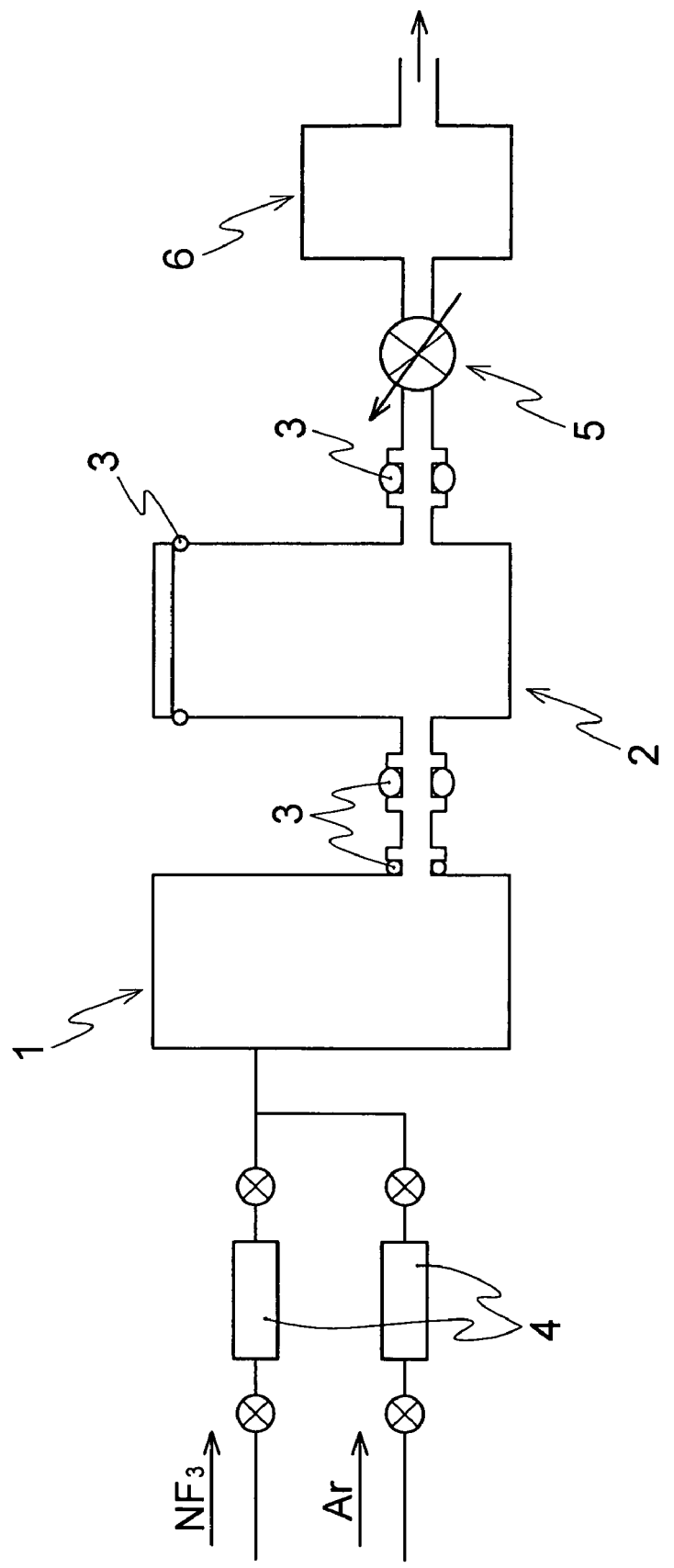

CROSSLINKABLE ELASTOMER COMPOSITION AND FORMED PRODUCT COMPRISING THE SAME

TECHNICAL FIELD

The present invention relates to a crosslinkable elastomer composition, in which the amount of HF generated under high temperature conditions is small, heat resistance and processability are improved, the decrease in weight to both $NF_3$ plasma treatment and $O_3$ treatment in the semiconductor manufacturing process is small and generation of foreign substances (particles) in these treatments is suppressed significantly, and a molded article comprising the composition.

BACKGROUND ART

Fluorine-containing elastomers, particularly perfluoro elastomers composed mainly of tetrafluoroethylene (TFE) units, exhibit excellent chemical resistance, solvent resistance and heat resistance and therefore are widely used as sealing material under severe conditions.

However, the desired properties have become more severe as technology advances, and in the fields of aerospace, semiconductor manufacturing equipment and chemical plant, sealing properties under high temperatures of 300° C. or higher is desired. Use under such high temperature conditions induce partial degradation of a polymer and cause generation of hydrogen fluoride (HF). Generation of HF at high temperatures not only adversely affects the members that the polymer contacts but is also presumed to adversely affect the elastomer, as HF is aggressive to molecular chains and crosslinking points of the elastomer.

Conventionally, decrease in generation of HF has been attempted by adding silicic acid anhydride ($SiO_2$) to a fluorine-containing elastomer (JP-A-2002-515525). Generation of HF can be sufficiently reduced according to this method. However, because $SiO_2$ contains a large amount of functional groups on the surface, the water content is difficult to control and when a large amount of $SiO_2$ is added, delay in curing of the crosslinking reaction occurs.

In the process of manufacturing a semiconductor, CVD is employed for the step of forming insulating membrane and thin film of metal wiring. In a CVD equipment, elastomeric sealing material is used for sealing various connecting and movable parts. These sealing materials are required not only to have sealing properties, but also to be able to withstand harsh plasma treatment conditions of high-density ($10^{12}$ to $10^{13}/cm^3$), as semiconductors are becoming microscopic and substrate wafers are becoming large, and to not contaminate the semiconductor, in which extremely precise processing is required. As an elastomeric material of sealing material that can handle such demands, a crosslinkable fluorine elastomer and silicone elastomer have been employed. Furthermore, in order to achieve mechanical strength more sufficiently than when crosslinked by an elastomer alone, usually an organic or inorganic filler is compounded. Examples of fillers that have been conventionally used or suggested are carbon black, silica (Japanese Patent No. 2783576, Japanese Patent No. 2858198), polytetrafluoroethylene (PTFE) powder, titanium oxide powder, clay, talc and barium sulfate.

In order to clean the chamber of CVD apparatus after the film forming process by CVD, cleaning is conducted by high-density F radical using $NF_3$ remote plasma. As shown in FIG. 1, in a CVD apparatus, remote plasma cleaning is conducted, by connecting another F radical generating machine 1, which can generate high-density F radical, to process chamber 2, in which CVD process is conducted, supplying high-density F radical into chamber 2 and decomposing and removing substances attached to the inside of chamber 2 and sealing material 3. In FIG. 1, numerals 4, 5 and 6 respectively represent a massflow adjuster, a pressure controller and a vacuum pump.

In the process of manufacturing a semiconductor, there is the wet process step, in which the wafer is washed using $O_3$ water. Consequently, the sealing material must be stable to not only $NF_3$ plasma treatment but also $O_3$ treatment.

However, of the above fillers, fillers such as silica and titanium oxide are stable to $O_3$ treatment but are decomposed by $NF_3$ plasma treatment, causing decrease in weight. On the other hand, fillers such as carbon black and PTFE powder are stable to $NF_3$ plasma treatment but are decomposed by $O_3$ treatment, causing decrease in weight. The decrease in weight of the filler that occurs due to the treatments indicates that the decreased matter adversely affects the semiconductor or liquid crystal in some way as unnecessary foreign substances.

As a filler that is stable to these treatments, alumina and an imide filler have been suggested (WO00/64980, WO01/32782). Alumina has resistance to both oxygen plasma and fluorine plasma and has the advantage that the product is not adversely affected even though dust is generated. However, there is the problem that alumina accelerates degradation of a fluorine elastomer under high-density and high temperature fluorine plasma. On the other hand, an imide filler does not generate dust as alumina and does not cause degradation of fluorine rubber as alumina.

In semiconductor equipment including CVD equipment, a switching valve called a gate valve or a slit valve is used for areas at which a wafer is inserted and taken out. The sealing material used in this valve is required to have high strength as the valve suffers mechanical abrasion when opening and closing the valve. However, an elastomer containing an imide filler having the above advantages has low strength, due to large particle size of the filler, and cannot sufficiently withstand the mechanical abrasion when opening and closing the valve. Also, there is the problem that processability of the composition is low, due to large particle size of the filler.

As described above, a fluorine-containing elastomer composition, in which the amount of HF generated under high temperature is small, heat resistance and processability are improved and plasma resistance is excellent, is not yet known.

DISCLOSURE OF INVENTION

The present invention aims to provide a crosslinkable elastomer composition, in which the amount of HF generated under high temperature conditions is small, heat resistance and processability are improved and the decrease in weight to both $NF_3$ plasma treatment and $O_3$ treatment in the semiconductor manufacturing process is small, and a molded article comprising the composition.

That is, the present invention relates to a crosslinkable elastomer composition comprising a crosslinkable elastomer and a filler having a specific surface area of at least 0.5 $m^2/g$ and containing a synthetic polymer having a thermally and chemically stable aromatic ring in the main chain.

The present invention also relates to a crosslinkable elastomer composition comprising a crosslinkable elastomer and nonoxide ceramics.

The present invention also relates to a crosslinkable elastomer composition wherein the decrease in weight by $NF_3$ plasma irradiation under the following conditions is at most 0.20%

Sample: O-Ring (AS-568A-214)

Measurement method: Fluorine radical generated by a fluorine radical generating machine under fluorine radical generating conditions (A) is sent to a process chamber and the sample is cleaned in the chamber under plasma irradiation conditions (B).

Fluorine radical generating conditions (A): Conditions that are equivalent to conditions in which $SiO_2$ etching rate is 1590 Å/min. under $NF_3$/argon=500 SCCM/500 SCM, pressure of 5 torr and temperature of 100° C.

Plasma Irradiation Conditions (B):
$NF_3$/argon: 1SLM/1SLM
Pressure: 5 torr
Irradiation time: 2 hours Irradiation temperature: 200° C.

The present invention also relates to a molded article and a sealing material obtained by crosslinking the crosslinkable elastomer composition.

BRIEF DESCRIPTION OF DRAWING

FIG. 1 is a schematic cross sectional view of a remote plasma apparatus for cleaning the elastomer molded article of the present invention.

BEST MODE FOR CARRYING OUT THE INVENTION

As the crosslinkable elastomer used in the present invention, a fluorine elastomer or a silicone elastomer can be used. From the viewpoints of heat resistance and resistance to various types of plasma, a fluorine-containing elastomer is preferable.

The fluorine-containing elastomer that can suitably be used in the present invention is not particularly limited, as long as it is an elastomer that is conventionally used for sealing material, particularly sealing material for semiconductor manufacturing equipment.

Examples of the fluorine-containing elastomer are fluorine rubber (a), thermoplastic fluorine rubber (b) and a rubber composition comprising these fluorine rubbers.

Examples of fluorine rubber (a) are nonperfluoro fluorine rubber (a-1) and perfluoro fluorine rubber (a-2).

Examples of thermoplastic fluorine rubber (b) are fluorine-containing multi-segmented polymer (b-1) comprising an elastomeric fluorine-containing polymer chain segment and a nonelastomeric fluorine-containing polymer chain segment, in which at least 90% by mol of the structural units of both the elastomeric fluorine-containing polymer chain segment and the nonelastomeric fluorine-containing polymer chain segment are perhalo olefin, fluorine-containing multi-segmented polymer (b-2) comprising an elastomeric fluorine-containing polymer chain segment and a nonelastomeric fluorine-containing polymer chain segment, in which at least 90% by mol of the structural units of the elastomeric fluorine-containing polymer chain segment are perhalo olefin and the nonelastomeric fluorine-containing polymer chain segment contains less than 90% by mol of perhalo olefin as structural units and fluorine-containing multi-segmented polymer (b-3) comprising an elastomeric fluorine-containing polymer chain segment and a nonelastomeric fluorine-containing polymer chain segment, in which the elastomeric fluorine-containing polymer chain segment contains less than 90% by mol of perhalo olefin as structural units and at least 90% by mol of the structural units of the elastomeric fluorine-containing polymer chain segment are perhalo olefin or the nonelastomeric fluorine-containing polymer chain segment contains less than 90% by mol of perhalo olefin as structural units.

Examples of the nonperfluoro fluorine rubber (a-1) are vinylidene fluoride (VdF) fluorine rubber, tetrafluoroethylene (TFE)/propylene fluorine rubber, tetrafluoroethylene (TFE)/propylene/vinylidene fluoride (VdF) fluorine rubber, ethylene/hexafluoroepropylene (HFP) fluorine rubber, ethylene/hexafluoropropylene (HFP)/vinylidene fluoride (VdF) fluorine rubber, ethylene/hexafluoropropylene (HFP)/tetrafluoroethylene (TFE) fluorine rubber, fluorosilicone fluorine rubber and fluorophosphazene fluorine rubber. These can be used alone or can be used in random combinations as long as the effects of the present invention are not lost.

Vinylidene fluoride fluorine rubber refers to a fluorine-containing elastic copolymer comprising 45 to 85% by mol of vinylidene fluoride and 55 to 15% by mol of at least one other monomer copolymerizable with vinylidene fluoride, preferably a fluorine-containing elastic copolymer comprising 50 to 80% by mol of vinylidene fluoride and 50 to 20% by mol of at least one other monomer copolymerizable with vinylidene fluoride.

Examples of the at least one other monomer copolymerizable with vinylidene fluoride are fluorine-containing monomers such as tetrafluoroethylene (TFE), chlorotrifluoroethylene (CTFE), trifluoroethylene, hexafluoropropylene (HFP), trifluoropropylene, tetrafluoropropylene, pentafluoropropylene, trifluorobutene, tetrafluoroisobutene, perfluoro(alkyl vinyl ether) (PAVE) and vinyl fluoride and nonfluorine-containing monomers such as ethylene, propylene and alkyl vinyl ether. These can be used alone or used in random combinations. Of these, tetrafluoroethylene, hexafluoropropylene and perfluoro(alkyl vinyl ether) are preferably used.

Specific examples of rubber are VdF-HFP rubber, VdF-HFP-TFE rubber, VdF-CTFE rubber and VdF-CTFE-TFE rubber.

Vinylidene fluoride fluorine rubber can be obtained by the usual method.

Tetrafluoroethylene/propylene fluorine rubber refers to a fluorine-containing elastic copolymer comprising 45 to 70% by mol of tetrafluoroethylene, 55 to 30% by mol of propylene and 0 to 5% by mol of a monomer that gives a crosslinking site.

Examples of the monomer that gives a crosslinking site are iodine-containing monomers such as perfluoro(6,6-dihydro-6-iodo-3-oxa-1-hexene) and perfluoro(5-iodo-3-oxa-1-pentene) described in JP-B-5-63482 and JP-A-7-316234, bromine-containing monomers described in JP-A-4-505341, monomers containing a cyano group, monomers containing a carboxyl group and monomer containing an alkoxycarbonyl group described in JP-A-4-505345 and JP-A-5-500070.

Tetrafluoroethylene/propylene fluorine rubber can also be obtained by the usual method.

These nonperfluoro fluorine rubbers (a-1) can be prepared by the usual method. Examples of commercially available nonperfluoro fluorine rubbers (a-1) are DAI-EL G-800 series and DAI-EL G-900 series available from Daikin Industries, Ltd.

An example of perfluoro rubber (a-2) is a fluorine-containing elastic copolymer comprising tetrafluoroethylene/perfluoro(alkyl vinyl ether)/monomer that gives a crosslinking site. The composition thereof is preferably 45 to 90/10 to 50/0 to 5 (% by mol), more preferably 45 to 80/20 to 50/0 to 5, further preferably 53 to 70/30 to 45/0 to 2. When the composition is out of this range, properties of a rubber elastic body are lost and the properties tend to become closer to those of resin.

Examples of the perfluoro(alkyl vinyl ether) in this case are perfluoro(methyl vinyl ether) and perfluoro(propyl vinyl ether). These can be used alone or can be used in random combinations as long as the effects of the present invention are not lost.

Examples of the monomer that gives a crosslinking site are the iodine-containing monomer represented by formula (1):

$$CX_2=CX-R_f CHRI \tag{1}$$

(wherein X is H, F or $CH_3$, $R_f$ is a fluoroalkylene group, a perfluoroalkylene group, a fluoropolyoxyalkylene group or a perfluoropolyoxyalkylene group, R is H or $CH_3$) and a monomer represented by formula (2):

$$CF_2=CFO(CF_2CF(CF_3))_m-O-(CF_2)_n-X \tag{2}$$

(wherein m is an integer of 0 to 5, n is an integer of 1 to 3, X is a cyano group, a carboxyl group, an alkoxycarbonyl group or a bromine group). These can be used alone or can be used in random combinations as long as the effects of the present invention are not lost.

The iodine and cyano groups can function as the crosslinking site.

The perfluoro fluorine rubber (a-2) can be prepared by the usual method.

Specific examples of the perfluoro fluorine rubber (a-2) are fluorine rubbers described in WO97/24381, JP-B-61-57324, JP-B-4-81608 and JP-B-5-13961.

The fluorine-containing multi-segmented polymer (b-1) comprising an elastomeric fluorine-containing polymer chain segment and a nonelastomeric fluorine-containing polymer chain segment, in which at least 90% by mol of the structural units of both the elastomeric fluorine-containing polymer chain segment and the nonelastomeric fluorine-containing polymer chain segment are perhalo olefin, which is a thermoplastic fluorine rubber (b), is described below.

The elastomeric fluorine-containing polymer chain segment is described. The elastomeric fluorine-containing polymer chain segment imparts flexibility to the polymer and has a glass transition temperature of at most 25° C., preferably at most 0° C. Examples of the perhalo olefin that constitute at least 90% by mol of the structural units thereof are tetrafluoroethylene, chlorotrifluoroethylene, hexafluoropropylene and fluorovinylether represented by formula (3):

$$CF_2=CFO(CF_2CFYO)_p-(CF_2CF_2CF_2O)_q-R_f \tag{3}$$

(wherein Y is F or $CH_3$, $R_f$ is a perfluoroalkylene group having 1 to 5 carbon atoms, p is an integer of 0 to 5, q is an integer of 0 to 5).

Examples of the structural units other than perhalo olefin that constitute the elastomeric fluorine-containing polymer chain segment are fluorine-containing monomers such as vinylidene fluoride, trifluoroethylene, tetrafluoroethylene, trifluoropropylene, tetrafluoropropylene, pentafluoropropylene, trifluorobutene, tetrafluoroisobutene and vinyl fluoride and nonfluorine-containing monomer such as ethylene, propylene and alkyl vinyl ether.

A preferable example of the elastomeric fluorine-containing polymer chain segment is an elastic polymer chain comprising tetrafluoroethylene/perfluoro(alkyl vinyl ether)/monomer that gives a crosslinking site. The composition thereof is preferably 50 to 85/50 to 15/0 to 5 (% by mol).

Examples of the monomer that gives a crosslinking site are the iodine-containing monomer represented by formula (4):

$$CX_2=CX-R_f CHRX^1 \tag{4}$$

(wherein X is H, F or $CH_3$, $R_f$ is a fluoroalkylene group, a perfluoroalkylene group, a fluoropolyoxyalkylene group or a perfluoropolyoxyalkylene group, R is H or $CH_3$ and $X^1$ is iodine or bromine) and a monomer represented by formula (5):

$$CF_2=CFO(CF_2CF(CF_3))_m-O-(CF_2)_n-X \tag{5}$$

(wherein m is an integer of 0 to 5, n is an integer of 1 to 3, X is a cyano group, a carboxyl group, an alkoxycarbonyl group or a bromine group).

The iodine, bromine, cyano groups, carboxyl groups and alkoxycarbonyl groups can function as the crosslinking site.

The nonelastomeric fluorine-containing polymer chain segment is described. Examples of the perhalo olefin that constitute at least 90% by mol of the structural units of the nonelastomeric fluorine-containing polymer chain segment are perhalo olefins such as tetrafluoroethylene, chlorotrifluoroethylene, perfluoro(alkyl vinyl ether), hexafluoropropylene, a compound represented by formula (6):

$$CF_2=CF(CF_2)_p-X \tag{6}$$

(wherein p is an integer of 1 to 10, X is F or Cl) and perfluoro-2-butene.

Examples of the structural units other than perhalo olefin that constitute the nonelastomeric fluorine-containing polymer chain segment are fluorine-containing monomers such as vinylidene fluoride, trifluoroethylene, tetrafluoroethylene, trifluoropropylene, tetrafluoropropylene, pentafluoropropylene, trifluorobutene, tetrafluoroisobutene and vinyl fluoride and nonfluorine-containing monomer such as ethylene, propylene and alkyl vinyl ether.

A preferable example of the nonelastomeric fluorine-containing polymer chain segment is a nonelastic polymer chain comprising 85 to 100% by mol of tetrafluoroethylene and 0 to 15% by mol of a compound represented by formula (7):

$$CF_2=CF-R_f \tag{7}$$

(wherein $R_f$ is $R_f^1$ or $-OR_f^1$, $R_f^1$ is a perfluoroalkyl group having 1 to 5 carbon atoms).

From the viewpoint of heat resistance of the obtained thermoplastic fluorine rubber (fluorine-containing multi-segmented polymer), the crystal melting point of the nonelastomeric fluorine-containing polymer chain segment is at least 150° C., preferably 200 to 360° C.

That is, the fluorine-containing multi-segmented polymer must be a fluorine-containing multi-segmented polymer, in which an elastomeric fluorine-containing polymer chain segment and a nonelastomeric fluorine-containing polymer chain segment are bonded by blocking or grafting in each molecule.

For the process for preparing the fluorine-containing multi-segmented polymer (b-1), various known methods can be employed to obtain a fluorine-containing multi-segmented polymer by connecting the elastomeric segment and the nonelastomeric segment by blocking or grafting. Particularly, the process for preparing a block-type fluorine-containing multi-segmented polymer described in JP-B-58-4728 and the process for preparing a graft-type fluorine-containing multi-segmented polymer described in JP-A-62-34324 are preferably employed.

Particularly, from the viewpoint that a homogeneous and regular segmented polymer having high segmentation ratio (block ratio) can be obtained, preferable is the block-type fluorine-containing multi-segmented polymer synthesized by the iodine transfer polymerization method described in JP-B-

58-4728 and KOBUNSHI RONBUNSHU Japanese Journal of Polymer Science and Technology (Vol. 49, No. 10, 1992).

In the case that a mixture of an elastomeric fluorine-containing polymer and a nonelastomeric fluorine-containing polymer obtained by merely mixing is used, although the effects differ according to the type, mixing properties and compatibility of each polymer that is mixed, usually, mechanical properties (particularly in high temperatures) may be insufficient and abrasion resistance, flexibility and durability may decrease.

On the other hand, by preparing a multi-segmented polymer by bonding the elastomeric segment and the nonelastomeric segment by blocking or grafting, heat resistance and mechanical properties (particularly in high temperatures) are improved in comparison to a mixture of an elastomeric fluorine-containing polymer and a nonelastomeric fluorine-containing polymer obtained by merely mixing.

The elastomeric segment can be prepared by the iodine transfer polymerization method, which is known as a process for preparing fluorine rubber (JP-B-58-4728, JP-A-62-12734). An example is the method of emulsion polymerizing perhalo olefin and when necessary, a monomer that gives a crosslinking site, in the presence of an iodine compound, preferably a diiodine compound while stirring, under pressure in a substantially oxygen-free atmosphere, in an aqueous medium, and in the presence of a radical initiator. Typical examples of the diiodine compound that is used are 1,3-diiodoperfluoropropane, 1,4-diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane and 1,2-diiodoethane. These compounds may be used alone or can be used in combination with one another. Particularly, 1,4-diiodoperfluorobutane is preferable. The amount of the diiodine compound is 0.01 to 1% by weight based on the total weight of the elastomeric segment.

The terminal of the elastomeric segment obtained in this way is a perhalo-type and has an iodine atom that is the initiation point of block copolymerization of the nonelastomeric segment.

The radical polymerization initiator used for preparing the elastomeric segment in the present invention can be an initiator that has been conventionally used for polymerization of a fluorine elastomer. Examples of such initiators are organic and inorganic peroxides and azo compounds. Typical initiators are persulfates, carbonate peroxides and ester peroxides and a preferable initiator is ammonium persulfate (APS). APS can be used alone or can be used in combination with reducing agents such as sulfites and sulfite salts.

The elastomeric segment obtained in this way preferably has number average molecular weight of 5,000 to 750,000, particularly 20,000 to 400,000, from the viewpoint of imparting flexibility, elasticity and mechanical properties to the entire fluorine-containing multi-segmented polymer.

Subsequently, block copolymerization of the nonelastomeric segment can be conducted subsequent to emulsion polymerization of the elastomeric segment by changing the monomer into those for a nonelastomeric segment.

The number average molecular weight of the nonelastomeric segment can be adjusted within a wide range of 1,000 to 1,200,000, preferably 3,000 to 600,000.

The fluorine-containing multi-segmented polymer (b-1) obtained in this way is composed mainly of polymer molecules in which nonelastomeric segments are bonded on both sides of the elastomeric segment and polymer molecules in which nonelastomeric segments are bonded on one side of the elastomeric segment. The amount of polymer molecules comprising elastomeric segments only, to which nonelastomeric segments are not bonded, are at most 20% by weight, preferably at most 10% by weight, based on the total weight of segments and polymer molecules in the fluorine-containing multi-segmented polymer.

The fluorine-containing multi-segmented polymer (b-2) comprising an elastomeric fluorine-containing polymer chain segment and a nonelastomeric fluorine-containing polymer chain segment, in which at least 90% by mol of the structural units of the elastomeric fluorine-containing polymer chain segment are perhalo olefin and the nonelastomeric fluorine-containing polymer chain segment contains less than 90% by mol of perhalo olefin as structural units, is described below.

The elastomeric fluorine-containing polymer chain segment thereof is the same as that given for fluorine-containing multi-segmented polymer (b-1).

The nonelastomeric fluorine-containing polymer chain segment is a polymer chain having a crystal melting point of at least 150° C., preferably 200 to 360° C.

Examples of the structural units of the nonelastomeric fluorine-containing polymer chain segment are vinylidene fluoride, vinyl fluoride, trifluoroethylene, a compound represented by formula (8):

$$CH_2=CX-(CF_2)_q-X \qquad (8)$$

(wherein X is H or F, q is an integer of 1 to 10) and partially fluorinated olefins such as $CH_2=C(CF_3)_2$.

Also, monomers that are copolymerizable with these monomers such as ethylene, propylene, vinyl chloride, vinyl ether, vinyl carboxylate and acrylic acid can be used as the copolymerization component.

The fluorine-containing multi-segmented polymer (b-2) can be prepared in the same manner as the fluorine-containing multi-segmented polymer (b-1).

The fluorine-containing multi-segmented polymer (b-3) comprising an elastomeric fluorine-containing polymer chain segment and a nonelastomeric fluorine-containing polymer chain segment, in which the elastomeric fluorine-containing polymer chain segment contains less than 90% by mol of perhalo olefin as structural units and at least 90% by mol of the structural units of the elastomeric fluorine-containing polymer chain segment are perhalo olefin or the nonelastomeric fluorine-containing polymer chain segment contains less than 90% by mol of perhalo olefin as structural units, is described below.

The elastomeric fluorine-containing polymer chain segment of the fluorine-containing multi-segmented polymer (b-3) is a polymer chain having a glass transition point of at most 25° C., preferably at most 0° C.

The elastomeric fluorine-containing polymer chain segment contains less than 90% by mol of perhalo olefin as structural units. Examples of the structural units other than perhalo olefin are the same as those given for vinylidene fluoride fluorine rubber, which is a nonperfluoro fluorine rubber (a-1).

The nonelastomeric fluorine-containing polymer chain segment of the fluorine-containing multi-segmented polymer (b-3) is the same as the nonelastomeric fluorine-containing polymer chain segment of the fluorine-containing multi-segmented polymers (b-1) and (b-2), preferably the same as the nonelastomeric fluorine-containing polymer chain segment in (b-2).

The fluorine-containing multi-segmented polymer (b-3) comprises 40 to 95% by weight of the elastomeric fluorine-containing polymer chain segment and 5 to 60% by weight of the nonelastomeric fluorine-containing polymer chain segment.

The fluorine-containing multi-segmented polymer (b-3) can be prepared in the same manner as the fluorine-containing multi-segmented polymers (b-1) and (b-2).

Specific examples of the fluorine-containing multi-segmented polymer (b-3) are DAI-EL Thermo T-530, T-550, T-630 available from Daikin Industries, Ltd. and CEFRAL SOFT available from Central Glass Co., Ltd.

In the present invention, a composition comprising the fluorine rubber (a) and the thermoplastic fluorine rubber described above can be used.

The first fluorine rubber composition comprising the nonperfluoro fluorine rubber (a-1) and the fluorine-containing multi-segmented polymer (b-1) can be obtained by mixing the nonperfluoro fluorine rubber (a-1) and the fluorine-containing multi-segmented polymer (b-1) as a dispersion or in any ratio by dry blending with an open roll.

Also, in order to improve mold release properties when molding, additives such as an internal mold release agent can be added accordingly as long as the effects of the present invention are not lost.

The second fluorine rubber composition comprising the nonperfluoro fluorine rubber (a-1) and the fluorine-containing multi-segmented polymer (b-2) can be obtained in the same manner as the first fluorine rubber composition.

The above additive can be added accordingly as long as the effects of the present invention are not lost and a crosslinking agent can be added depending on the type of the crosslinking method described below.

The third fluorine rubber composition comprising the perfluoro fluorine rubber (a-2) and the fluorine-containing multi-segmented polymer (b-3) can be obtained in the same manner as the first fluorine rubber composition.

The above additive can be added accordingly as long as the effects of the present invention are not lost and a crosslinking agent can be added depending on the type of the crosslinking method described below.

The fourth fluorine rubber composition comprising the perfluoro fluorine rubber (a-2) and the fluorine-containing multi-segmented polymer (b-1) can be obtained in the same manner as the first fluorine rubber composition.

Both the perfluoro fluorine rubber (a-2) and the fluorine-containing multi-segmented polymer (b-1) are poor in crosslinking efficiency by radiation and substantially cannot be crosslinked by radiation. Therefore, to crosslink, a crosslinking site by which peroxide crosslinking, for example, is made possible must be introduced into at least one of the rubber.

As the fluorine rubber in which a crosslinking site is introduced, a fluorine rubber, in which iodine or bromine is introduced into the polymer terminal, is suitable. This fluorine rubber is obtained by introducing a compound represented by formula (9):

$$RI_xBr_y \quad (9)$$

(wherein R is a saturated or unsaturated fluorohydrocarbon group or chlorofluorohydrocarbon group having 1 to 16 carbon atoms or a hydrocarbon group having 1 to 3 carbon atoms, x and y are respectively an integer of 0 to 2 and $1 \leq x+y \leq 2$) when preparing by polymerization. The iodine or bromine that is introduced in this way functions as a crosslinking site.

Examples of compounds represented by formula (9):

$$RI_xBr_y \quad (9)$$

(wherein R is a saturated or unsaturated fluorohydrocarbon group or chlorofluorohydrocarbon group having 1 to 16 carbon atoms or a hydrocarbon group having 1 to 3 carbon atoms, x and y are respectively an integer of 0 to 2 and $1 \leq x+y \leq 2$) are 1,3-diiodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluoroebutane, 3-bromo-4-iodoperfluorobutene-1, 2-bromo-4-iodoperfluorobutene-1, monoiodomonobromo-substituted benzene, diiodomonobromo-substituted benzene and (2-iodoethyl) and (2-bromoethyl) substituted benzene.

Of these, from the viewpoints of polymerization reactivity, crosslinking reactivity and availability, 1,4-diiodoperfluorobutane and diiodomethane are preferably used.

The amount of the compound represented by formula (9):

$$RI_xBr_y \quad (9)$$

(wherein R is a saturated or unsaturated fluorohydrocarbon group or chlorofluorohydrocarbon group having 1 to 16 carbon atoms or a hydrocarbon group having 1 to 3 carbon atoms, x and y are respectively an integer of 0 to 2 and $1 \leq x+y \leq 2$) is 0.0001 to 5% by weight, preferably 0.01 to 1% by weight of the total weight of the obtained fluorine rubber.

An example of another method for introducing the crosslinking site is the method of copolymerizing a small amount of the monomer that gives a crosslinking site.

As such monomers, iodine-containing monomers such as perfluoro(6,6-dihydro-6-iodo-3-oxa-1-hexene) and perfluoro(5-iodo-3-oxa-1-pentene) described in JP-B-5-63482 and JP-A-7-316234, bromine-containing monomers described in JP-A-4-505341, a monomer containing a cyano group, a monomer containing a carboxyl group and a monomer containing an alkoxycarbonyl group described in JP-A-4-505345 and JP-A-5-500070 are suitable.

The fifth fluorine rubber composition comprising the perfluoro fluorine rubber (a-2) and the fluorine-containing multi-segmented polymer (b-2) can be obtained in the same manner as the first fluorine rubber composition.

The above additive can be added accordingly as long as the effects of the present invention are not lost and a crosslinking agent can be added depending on the type of the crosslinking method described below.

The monomer mixed gas used in the present invention is explosive, as described by G. H. Kalb et al., in Advances in Chemistry Series, 129, 13 (1973), and the polymerization device must be designed so that sparks, which become the ignition source, are not generated. In light of this, the polymerization pressure is preferably kept as low as possible.

The polymerization pressure can be changed in a wide range and is usually within the range of 0.5 to 5 MPa. The higher the polymerization pressure is the higher the polymerization rate and therefore, from the viewpoint of improvement in productivity, the polymerization pressure is preferably at least 0.8 MPa.

Some of the polymerization products obtained in this way do not contain free carboxyl groups, depending on the polymerization conditions, but by subjecting to the following acid treatment, the groups can be converted into free carboxyl groups.

Examples of the silicone elastomer used in the present invention are silicone rubber and fluorosilicone rubber.

Among the crosslinkable elastomers obtained in this way, the fluorine-containing elastomer used in the present invention is preferably a copolymer comprising tetrafluoroethylene/perfluoro(alkyl vinyl ether)/monomer having a crosslinkable functional group, from the viewpoints of heat resistance and chemical resistance.

Examples of the perfluoro(alkyl vinyl ether) are perfluoro(methyl vinyl ether) (PMVE), perfluoro(ethyl vinyl ether) (PEVE) and perfluoro(propyl vinyl ether) (PPVE) and of these, PMVE is preferable from the viewpoint that cold resistance is excellent.

From the viewpoint of copolymerization reactivity, the monomer for introducing the crosslinking point is preferably an iodine-containing monomer, a monomer containing a cyano group, a monomer containing a carboxyl group and a monomer containing an alkoxycarbonyl group. A monomer containing a cyano group is more preferable, from the viewpoints of crosslinking reactivity and heat resistance of the crosslinking structure formed by the crosslinking reaction.

An example of the method for introducing a carboxyl group, an alkoxycarbonyl group, an iodine atom, a bromine atom or a sulfonic acid group into the polymer terminal group of the crosslinkable elastomer is the acid treatment described below.

The above crosslinkable elastomer can be prepared by polymerization methods such as emulsion polymerization, suspension polymerization and solution polymerization.

The emulsifying agent used for emulsion polymerization can be selected from a wide range but from the viewpoint of inhibiting the chain transfer reaction to the emulsifier molecules that occurs during polymerization, salts of carboxylic acid having a fluorocarbon chain or a fluoropolyether chain are preferable. The amount of the emulsifier is preferably about 0.05 to 2% by weight, more preferably 0.2 to 1.5% by weight of the amount of water that is added.

As the polymerization initiator used for polymerization of the crosslinkable elastomer, an initiator capable of introducing a carboxyl group or a group capable of producing a carboxyl group (for example, acid fluoride, acid chloride, $CF_2OH$, all of which produce a carboxyl group in the presence of water) into the elastomer terminal is preferably used. Specific examples are ammonium persulfate (APS) and potassium persulfate (KPS).

A chain transfer agent that is usually used to adjust molecular weight can be used, but is preferably used as little as possible, as the ratio of groups capable of producing carboxyl groups and carboxyl groups that are introduced into the terminal decreases. However, this does not apply when the chain transfer agent is capable of introducing the above group into the elastomer terminal. When a chain transfer agent is not used, the molecular weight can be adjusted by conducting polymerization under low pressure, for example less than 2 MPa·G, more preferably at most 1 MPa·G. Other polymerization conditions are not particularly limited. However, in order to obtain a polymerization product having a carboxyl group in the terminal and/or a branched chain without subjecting to the acid treatment described below, the pH of the polymerization system is preferably set to a strong acidic value of at most pH 3.

With respect to the crosslinkable elastomer used in the present invention, groups such as metallic salt and ammonium salt of carboxylic acid that are present in the polymerization product are preferably converted into carboxyl groups, by subjecting the polymerization product to acid treatment. As the method for acid treatment, the method of cleaning with hydrochloric acid, sulfuric acid or nitric acid and the method of adjusting the pH of the system after polymerization reaction to at most pH 3 with these acids are suitable.

From the viewpoint of simplifying the process, this acid treatment is preferably applied as a means for agglomeration when isolating the polymerization product from the polymerization reaction mixture by agglomeration. Also, the polymerization mixture can be subjected to acid treatment and then the polymer product can be isolated by means of lyophilization. Furthermore, the methods of agglomeration by ultrasonic waves or mechanical power can be employed.

Also, a carboxyl group can be introduced by oxidizing a crosslinkable elastomer containing iodine or bromine by fuming sulfic acid.

Examples of the crosslinking agent used in the present invention are peroxide crosslinking-types, polyol crosslinking-types, polyamine crosslinking-types, triazine crosslinking-types, oxazole crosslinking-types, imidazole crosslinking-types, thiazole crosslinking-types and radiation crosslinking-types.

The crosslinking agent used in peroxide crosslinking is an organic peroxide that can easily produce peroxy radical in the presence of heat or an oxidization-reduction system. Examples are 1,1-bis(t-butylperoxy)-3,5,5-trimethylcyclohexane, 2,5-dimethylhexane-2,5-dihydroperoxide, di-t-butylperoxide, t-butylcumylperoxide, dicumylperoxide, α,α-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoylperoxide, t-butylperoxybenzene, 2,5-dimethyl-2,5-di(benzoylperoxy)hexane, t-butylperoxy maleate and t-butylperoxyisopropyl carbonate. Of these dialkyl types are preferable. Furthermore, 2,5-dimethyl-2,5-di(t-butylperoxy)hexane is particularly preferable. Usually, the type and amount of the organic peroxide is selected in consideration of the amount of active —O—O— and decomposition temperature.

The crosslinking aid that can be used in the above case is a compound that has reaction activity to peroxy radical and polymer radical. Examples are multifunctional compounds having a functional group such as $CH_2$=CH—, $CH_2$=CHCH$_2$— and $CF_2$=CF—. Specific examples are triallyl cyanurate, triallyl isocyanurate (TAIC), triacrylformal, triallyl trimellitate, N,N'-n-phenylenebismaleimide, dipropargyl terephthalate, diallyl phthalate, tetraallylterephthalateamide, triallyl phosphate, bismaleimide, fluorinated triallyl isocyanurate (1,3,5-tris(2,3,3-trifluoro-2-propenyl)-1,3,5-triazine2,4,6-trione), tris(diallylamine)-S-triazine, triallyl phosphite, N,N-diallylacrylamide and 1,6-divinyldodecafluorohexane.

Examples of the crosslinking agent used for polyol crosslinking are polyol compounds such as bisphenol A and bisphenol AF.

Examples of the crosslinking agent used for polyamine crosslinking are polyvalent amine compounds such as hexamethylenediaminecarbamate, N,N'-dicinnamylidene-1,6-hexanediamine and 4,4'-bis(aminocyclohexyl)methanecarbamate.

Examples of the crosslinking agent used for triazine crosslinking are organic tin compounds such as tetraphenyl tin and triphenyl tin.

Examples of the crosslinking agent used for oxazole crosslinking, imidazole crosslinking and thiazole crosslinking are a bisdiaminophenyl crosslinking agent, a bisaminophenol crosslinking agent, a bisaminothiophenol crosslinking agent, represented by formula (10):

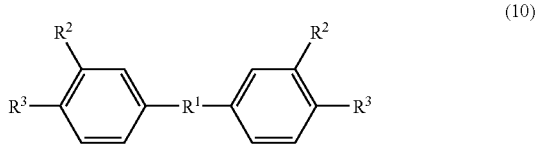

(wherein $R^1$ is —$SO_2$—, —O—, —CO—, an alkylene group having 1 to 6 carbon atoms, a perfluoroalkylene group having 1 to 10 carbon atoms or a single bond, one of $R^2$ and $R^3$ is —$NH_2$ and the other is —$NH_2$, —OH or —SH, preferably both $R^2$ and $R^3$ are —$NH_2$), a bisamidrazone crosslinking agent represented by formula (11):

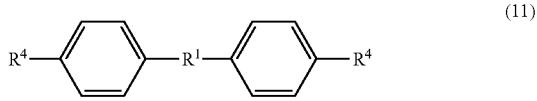

(wherein $R^1$ is the same as above and $R^4$ is

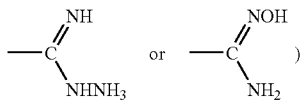

and a bisamidoxime crosslinking agent represented by formula (12) or (13):

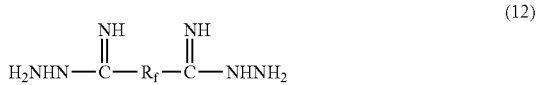

(wherein $R_f$ is a perfluoroalkylene group having 1 to 10 carbon atoms),

(wherein n is an integer of 1 to 10). The bisaminophenol crosslinking agent, the bisaminothiophenol crosslinking agent and the bisdiaminophenyl crosslinking agent have been conventionally used in a crosslinking type, in which the crosslinking point is a cyano group, but also react with a carboxyl group and an alkoxycarbonyl group and form an oxazole ring, thiazole ring and an imidazole ring to give a crosslinked article.

Of these crosslinking agents, from the viewpoints that heat resistance is particularly excellent, crosslinking reactivity is favorable and synthesis is relatively easy, a more preferable crosslinking agent is a bisdiaminophenyl crosslinking agent having at least two bisamino crosslinkable functional groups represented by formula (14):

(wherein $R^5$ is a fluorine atom or a monovalent organic group). Examples of a functional group that can be reacted with the crosslinkable functional groups are a cyano group, a carboxyl group and an alkoxycarbonyl group and an imidazole ring is formed by the reaction.

A further preferable crosslinking agent is a compound represented by formula (15):

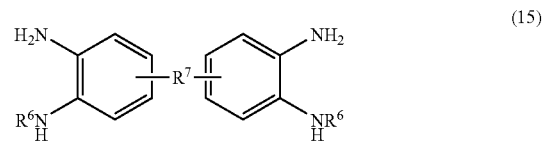

The substitutent $R^6$ in the crosslinkable reactive group is a monovalent organic group other than hydrogen or a fluorine atom and a substitutent that forms an N—$R^6$ bond having higher oxidization resistance than an N—H bond is particularly preferable. Herein, "a substitutent that forms an N—$R^6$ bond having higher oxidization resistance than an N—H bond" refers to a substitutent that forms an N—$R^6$ bond that is present in a compound that has more difficulty oxidizing than a compound having an N—H bond when forming a imidazole ring.

Such $R^6$ is not particularly limited but examples are an aliphatic hydrocarbon group that can be substituted, a phenyl group that can be substituted or a benzyl group.

Specific examples are compounds wherein at least one $R^6$ is a lower alkyl group having 1 to 10, preferably 1 to 6 carbon atoms, such as —$CH_3$, —$C_2H_5$ and —$C_3H_7$; a fluorine-containing lower alkyl group having 1 to 10, preferably 1 to 6 carbon atoms, such as —$CF_3$, —$C_2F_5$, —$CH_2F$, —$CH_2CF_3$ and —$CH_2C_2F_5$; a phenyl group; a benzyl group; a phenyl group or a benzyl group wherein 1 to 5 hydrogen atoms are substituted with a fluorine atom such as —$C_6F_5$ and —$CH_2C_6F_5$; and a phenyl group or a benzyl group wherein 1 to 5 hydrogen atoms are substituted with —$CF_3$, such as —$C_6H_{5-n}(CF_3)_n$ and —$CH_2C_6H_{5-n}(CF_3)_n$ (wherein n is an integer of 1 to 5).

Of these, a phenyl group and —$CH_3$ are preferable, from the viewpoints that heat resistance is particularly excellent, crosslinking reactivity is favorable and synthesis is relatively easy.

In the compound represented by formula (15), $R^7$ is —$SO_2$—, —O—, —CO—, an alkylene group that can be substituted,

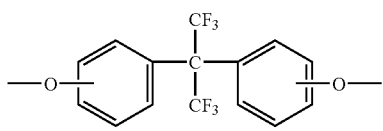

or a single bond.

Preferable examples of the alkylene group that can be substituted of $R^7$ are not particularly limited but examples are a nonsubstituted alkylene group having 1 to 6 carbon atoms and a perfluoroalkylene group having 1 to 10 carbon atoms. An example of the perfluoroalkylene group is

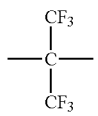

The examples of $R^7$ are known as examples of bisdiaminophenyl compounds from JP-B-2-59177 and JP-A-8-120146.

$R^7$ can be bonded to any position of both the right and the left benzene rings but from the viewpoint that synthesis and crosslinking reaction can be conducted with ease, either an —$NH_2$ group or an —$NHR^7$ is preferably bonded at the para position.

A particularly preferable example of the crosslinking agent is a compound represented by formula (16):

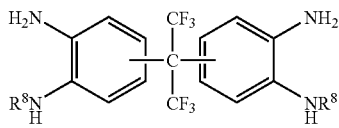

(16)

(wherein $R^8$ is the same or different and are an alkyl group having 1 to 10 carbon atoms, an alkyl group having 1 to 10 carbon atoms containing a fluorine atom, a phenyl group, a benzyl group or a phenyl group or a benzyl group wherein 1 to 5 hydrogen atoms are substituted with a fluorine atom or —$CF_3$.

Although not limited to these, examples are 2,2-bis-[3-amino-4-(N-methylamino)phenyl]hexafluoropropane, 2,2-bis-[3-amino-4-(N-ethylamino)phenyl]hexafluoropropane, 2,2-bis-[3-amino-4-(N-propylamino)phenyl]hexafluoropropane, 2,2-bis-[3-amino-4-(N-phenylamino)phenyl]hexafluoropropane, 2,2-bis-[3-amino-4-(N-perfluorophenylamino)phenyl]hexafluoropropane, 2,2-bis-[3-amino-4-(N-benzylamino)phenyl]hexafluoropropane, 2,2-bis(3-amino-4-hydroxyphenyl)hexafluoropropane (generic name: bis(aminophenol)AF), 2,2-bis(3-amino-4-mercaptophenyl)hexafluoropropane, tetraminobenzene, bis-3,4-diaminophenylmethane, bis-3,4-diaminophenylether and 2,2-bis-(3,4-diaminophenyl)hexafluoropropane.

The crosslinking agents described above are excellent in mechanical strength, heat resistance and chemical resistance and give an excellent crosslinked article having good balance in heat resistance and chemical resistance.

The amount of the crosslinking agent of the crosslinkable elastomer is preferably 0.05 to 10 parts by weight, more preferably 1 to 5 parts by weight, based on 100 parts by weight of the crosslinkable elastomer. When the amount of the crosslinking agent is less than 0.05 part by weight, the crosslinkable elastomer may not be crosslinked sufficiently and when the amount is more than 10 parts by weight, properties of the crosslinked article tends to become poor.

The filler comprising a synthetic polymer that is used in the present invention is not particularly limited but preferably has a thermally and chemically stable aromatic ring in the main chain. Also, the synthetic polymer is preferably a synthetic polymer that has an amide bond or an imide bond in the main chain.

Because sufficient durability can be achieved when used in high temperatures as sealing material in a high temperature thermal treatment apparatus, the synthetic filler preferably has heat resistance (crystal melting point, glass transition temperature or temperature at which weight decreases 5%) at 200° C. or higher, more preferably at 220° C. or higher.

Examples of a filler having heat resistance at 200° C. or higher are a resin having a repeating unit containing at least one structural unit X and a resin containing at least one each of a repeating unit having at least one structural unit X and a repeating unit having at least one structural unit Y.

Examples of the structural unit X are carbon single rings such as

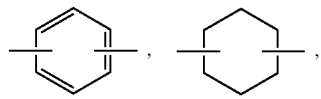

carbon condensed rings such as

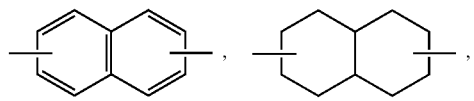

complex single rings such as

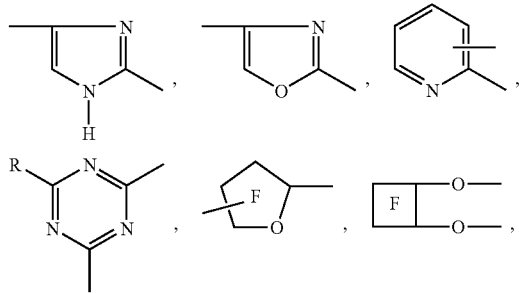

and complex condensed rings such as

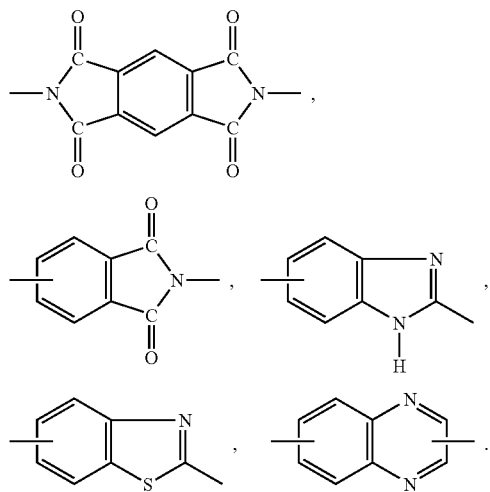

Examples of the structural unit Y are nonconjugated functional groups such as

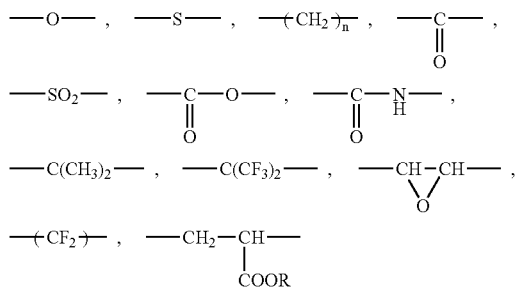

(R is an alkyl group), and conjugated functional groups such as

—CH=CH—, —C≡C—, —N=N—, —CH=N—.

Specifically, resin having the following repeating units are preferable:

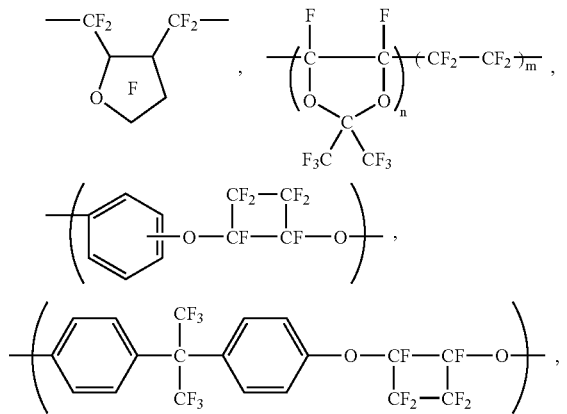

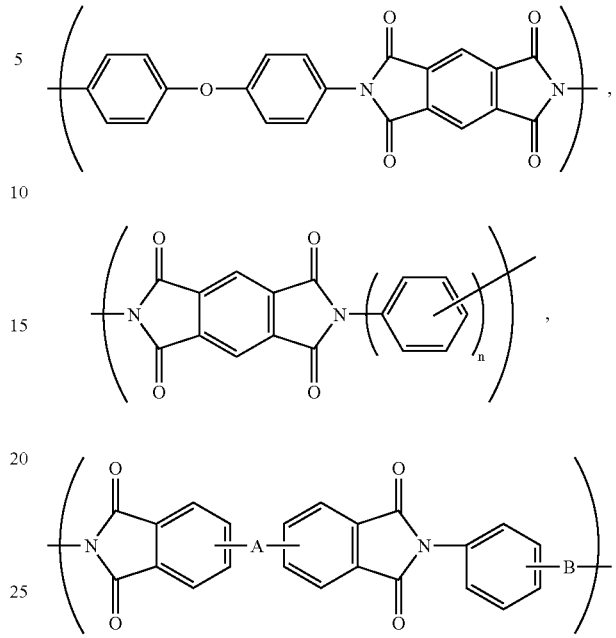

(wherein A is a single bond, —O— or —C(=O); B is a single bond, —O—, —S—, —C(=O), —CH₂ or —C(CF₃)₂—).

Particularly, a resin (III) having at least one of the following repeating units

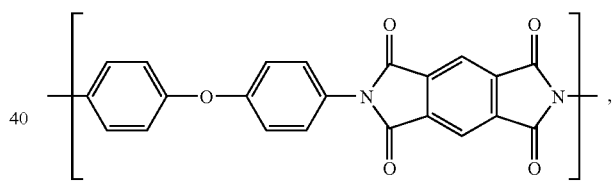

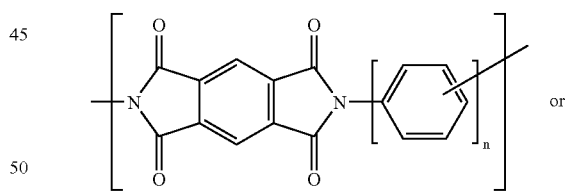

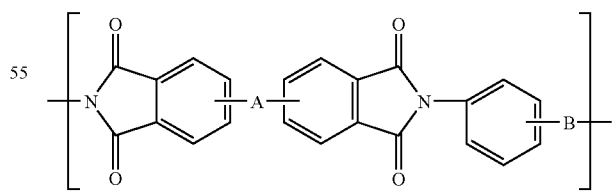

(wherein A is a single bond, —O— or —C(=O)—; B is a single bond, —O—, —S—, —C(=O)—, —CH₂— or —C(CF₃)₂—; n is an integer of 0 to 5), especially a resin (IV) having the repeating unit

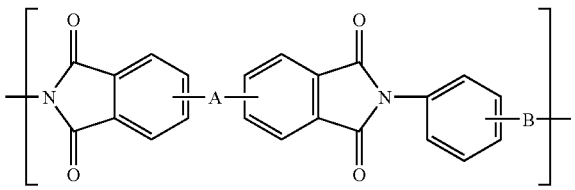

(wherein A is a single bond, —O— or —C(=O)—; B is a single bond, —O—, —S—, —C(=O)—, —CH₂— or —C(CF₃)₂—) is preferably contained.

A more specific example is

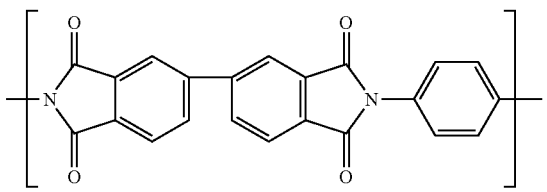

Examples of such fillers are imide fillers having an imide structure such as polyimide, poly(amide imide) and poly (ether imide) and organic fillers made of engineering plastic such as polyalylate, polysulfone, polyether sulfone, polyphenylene sulfide, poly(ether ether ketone and polyoxybenzoate.

Of these, from the viewpoint of heat resistance, low metal content and low out-gas properties, an imide filler is preferable.

The specific surface area of the filler is preferably at least 0.5 m²/g, more preferably at least 2 m²/g, further preferably at least 5 m²/g. When the specific surface area is less than 0.5 m²/g, reinforcing properties are poor and strength and elongation at break tend to decrease more than in the case when a filler is not used at all.

The shape of the filler is not particularly limited and not only spherical fillers but also scaly fillers can be used. When the filler is spherical, a molded article having low anisotropy is obtained and when the filler is scaly, a molded article having reinforcing properties in a particular direction is obtained.

The particle size of the filler is preferably at most 5 μm, more preferably at most 2 μm, further preferably at most 0.5 μm. When the particle size is larger than 5 μm, reinforcing properties are poor and strength and elongation at break tend to decrease more than in the case when a filler is not used at all. When the filler is a scaly filler, the diameter is preferably 0.05 to 4 μm, more preferably at most 2 μm. The thickness is preferably 0.05 to 2 μm, more preferably at most 1 μm.

At present, the particle size of fillers that are commercially available are coarse and the specific surface area is quite small. When using in the present invention, the filler must be pulverized to increase the specific surface area. Examples of the method for pulverizing are jet mill pulverizing (dry pulverization) and the method of preparing a slurry by adding a dispersion medium such as water or an organic solvent, applying pressure to the beads mill and liquid and spraying from a nozzle to counter collide (wet pulverization). To obtain a filler having large specific surface area, pulverization is preferably conducted by a combination of wet pulverization and dry pulverization (jet mill).

In the crosslinkable elastomer composition, the amount of the filler of the present invention is preferably 1 to 50 parts by weight, more preferably 5 to 20 parts by weight, based on 100 parts by weight of the crosslinkable elastomer. When the amount of filler is less than 1 part by weight based on 100 parts by weigh of the crosslinkable elastomer, the effects of the filler can hardly be obtained and when the amount is more than 50 parts by weight, the hardness becomes extremely high, thus being unfavorable as sealing material. The crosslinkable elastomer composition containing a filler is useful as molding material for various molded articles and coating material for various elastomeric molded articles.

Examples of the nonoxide ceramics used in the present invention are borides such as titanium boride, nickel boride, chromium boride, zirconium boride and tantalum boride; carbides such as titanium carbide, boron carbide, zirconium carbide, hafnium carbide, tantalum carbide, tungsten carbide, niobium carbide and silicon carbide; nitrides such as titanium nitride, aluminum nitride and boron nitride; silicides such as titanium silicide and molybdenum silicide; sulfides such as tungsten sulfide and molybdenum sulfide and phosphides such as iron phosphide and nickel phosphide.

Such nonoxide ceramics differ from oxide ceramics in that covalent bonding properties are usually higher, are used for high temperature structural material and have high chemical stability. For example, although a silicon compound, silicon carbide can resist HF unlike SiO₂. Such substances that are considered to have stability up to high temperatures of more than 1000° C. were not expected to exhibit the function of collecting HF near 300° C. Also, as nonoxide ceramics have high chemical stability and do not have functional groups on the powder surface, nonoxide ceramics were presumed to not contribute to the crosslinking reaction, but was found to have the unexpected effect of accelerating the crosslinking reaction (effect of improving processability).

Of these nonoxide ceramics, silicon nitride, silicon carbide and aluminum nitride are more preferable, from the viewpoints that the effect of accelerating the crosslinking reaction is large, HF-collecting ability is high and when a sealing material using the composition of the present invention is used in semiconductor manufacturing equipment, contaminating substances are not generated in the equipment.

The nonoxide ceramics can be used alone or two or more kinds can be used together.

The nonoxide ceramics are preferably made into powder by a pulverization method using a pulverizer such as a jet mill and a method of forming powder by occurrence and growth of core from an atom or molecule. In the case of the latter, the method is a vapor phase method, a liquid phase method or a solid phase method depending on the state of the starting material. The process for preparing the powder is not particularly limited as long as the purity of the obtained nonoxide ceramics powder is sufficiently high. Among the nonoxide ceramics, the purity of aluminum nitride is preferably at least 95% from the viewpoint that plasma resistance is excellent.

The form of the nonoxide ceramics powder is not particularly limited and can be fine powder, particulate, fibrous or whiskers. From the viewpoint of processability, the powder is preferably in the form of particles and the particle size thereof is preferably at most 10 μm. When the particle size is more than 10 μm, reinforcing properties are poor and the amount that is added to the compound must be increased, thereby decreasing the properties of the molded article as a sealing material. Furthermore, when using as sealing material for semiconductor manufacturing equipment, the particle size is at most 1 μm, preferably at 0.01 to 0.5 μm, from the viewpoint that a small amount of particles are generated. The lower limit of the particle size is not particularly defined.

The amount of the nonoxide ceramics is preferably 1 to 50 parts by weight, more preferably 5 to 30 parts by weight, based on 100 parts by weight of the fluorine-containing elastomer. When the amount is less than 1 part by weight, function as a filler is hardly obtained and when the amount is more than 50 parts by weight, the hardness becomes extremely high and properties as an elastic body tend to be lost.

The crosslinkable elastomer composition of the present invention is characterized in that the decrease in weight by $NF_3$ plasma irradiation under the following conditions is small.

Sample: O-ring (AS-568A-214)

Measurement method: Fluorine radical generated by a fluorine radical generating machine under fluorine radical generating conditions (A) is sent to a process chamber and the sample is cleaned in the chamber under plasma irradiation conditions (B).

Fluorine radical generating conditions (A): Conditions that are equivalent to conditions in which $SiO_2$ etching rate is 1590 Å/min. under $NF_3$/argon=500 SCCM/500 SCM, pressure of 5 torr and temperature of 100° C.

Plasma irradiation conditions (B):
$NF_3$/argon: 1SLM/1SLM
Pressure: 5 torr
Irradiation time: 2 hours
Irradiation temperature: 200° C. or 300° C.

In the $NF_3$ plasma irradiation conditions of the present invention, the plasma irradiation temperatures are 200° C. (plasma irradiation conditions (B)) and 300° C. (plasma irradiation conditions (B1)) and the decrease in weight at plasma irradiation temperature of 200° C. is at most 0.20%, preferably at most 0.18% by weight. More preferably, the decrease in weight at a more severe plasma irradiation temperature of 300° C. is at most 0.20%, preferably at most 0.18% by weight. The less the decrease in weight is the better the molded article and so the lower limit is not particularly limited.

To satisfy the above radical properties, the nonoxide ceramics filler, resin (I) or resin (II) can be used alone or added in combination.

In the present invention, in fields in which high purity and non-contaminating properties are not particularly required, when necessary, additives that are usually compounded in a crosslinkable elastomer composition can be compounded, such as a filler, a processing aid, a plasticizer and a colorant. At least one type of a commonly used crosslinking agent and a crosslinking accelerator that differ from those described above may also be compounded.

The composition and material for molding and coating of the present invention can be prepared by mixing each of the above components using the usual elastomer processing machine such as an open roll, a Banbury mixer and a kneader. The composition can also be prepared by the method of using an internal mixer and the method of co-coagulating from an emulsion mixture.

The method for obtaining a pre-molded article from the above compositions and materials can be the usual method and known methods such as the method of heat compressing in a metal mold, the method of injecting into a heated metal mold and the method of extruding with an extruder can be used. Extruded products such as a hose and electric wire can maintain its form after extrusion and therefore, the pre-molded article extruded without using a crosslinking agent can be used as it is. A pre-molded article subjecting to heat crosslinking by steam using a crosslinking agent can also be used. Also, in the case that maintaining the shape of a molded article such as an O-ring is difficult in an uncrosslinked state after mold-releasing, the article can maintain the shape by using a pre-molded article that is crosslinked in advance using a crosslinking agent.

When conducting peroxide crosslinking, crosslinking can be conducted under the usual crosslinking conditions of a crosslinkable elastomer. For example, press crosslinking is conducted by placing the elastomer in a metal die and holding under pressure at 120 to 200° C. for 1 to 60 minutes and subsequently, oven crosslinking is conducted by holding in an oven of 120 to 250° C. for 0 to 48 hours, to obtain a crosslinked article.

In the present invention, when conducting oxazole crosslinking using a crosslinking agent such as bisaminophenol, crosslinking can be conducted under the usual crosslinking conditions of a crosslinkable elastomer. For example, press crosslinking is conducted by placing the elastomer in a metal die and holding under pressure at 120 to 250° C. for 1 to 60 minutes and subsequently, oven crosslinking is conducted by holding in an oven of 120 to 320° C. for 0 to 48 hours, to obtain a crosslinked article. Also, a crosslinking agent such as bis(aminophenol)AF and known crosslinking agents such as polyamine crosslinking agents, polyol crosslinking agents and peroxide crosslinking agents can be used together.

Imidazole crosslinking, in which a carboxyl group is crosslinked with a bisdiaminophenyl crosslinking agent, is most suitable for a carboxyl-containing polymer that has a carboxyl group in an area other than the terminal and gives a crosslinked article having favorable properties at a relatively low crosslinking temperature (for example 150 to 230° C., preferably 170 to 200° C.).

For uses in which non-contaminating properties are strongly desired such as semiconductor manufacturing equipment, high-energy crosslinking is preferably conducted without using a crosslinking agent. As the crosslinking source, X-rays, α-rays, β-rays, γ-rays, electron beams, proton beams, deuteron rays and ultraviolet rays are used. In such a case, the irradiation amount is preferably 0.1 to 50 Mrad. The irradiation temperature is preferably −20 to 100° C. Irradiation can be conducted in the presence of air, nitrogen, argon or helium or in vacuum. From the viewpoint of preventing oxidization and degradation of the surface of the molded article, irradiation is preferably conducted under nitrogen, argon or helium, which are inert gases, more preferably in vacuum.

The above composition or molding material can be crosslinked and molded and can be suitably used for a molded article for semiconductor manufacturing equipment, particularly for a sealing material for sealing in a semiconductor manufacturing equipment in which a high degree of cleanliness is required, specifically semiconductor manufacturing equipment in which high-density plasma irradiation is conducted. Examples of the sealing material are an O-ring, a square-ring, a gasket, a packing, an oil seal, a bearing seal and a lip seal.

Also, the various elastomer products used in a semiconductor manufacturing equipment can be used as a diaphragm, a tube, a hose and various rubber rolls. The elastomer products can also be used as laminating material and lining material.

The semiconductor manufacturing equipment in the present invention is not particularly limited to equipment for manufacturing semiconductors and includes manufacturing equipment in general that is used in the semiconductor field, which require a high degree of cleanliness, such as equipment for manufacturing liquid crystal panels and plasma panels.

The elastomeric molded article can be coated with the above coating material and then crosslinked to obtain a coated molded article.

As the elastomeric molded article that is to be coated, articles made of various elastomeric materials can be used and from the viewpoint of heat resistance, fluorine elastomers and silicone elastomers are preferable.

Such molded articles and coated molded articles are useful as various molded articles in the fields shown below in Tables 1 to 3.

TABLE 1

| Industrial field | Industrial sub-field | Final product | Equipment | Parts |
|---|---|---|---|---|
| Electric | Semiconductor | Semiconductor manufacturing equipment Liquid crystal panel manufacturing equipment Plasma panel manufacturing equipment | CVD equipment Dry etching equipment Wet etching equipment Oxidation and diffusion equipment Sputtering equipment Ashing equipment Cleaning equipment Ion implantation equipment | O (square) ring, packing, sealing material, tube, roll, coating, lining, gasket, diaphragm, hose |
| Transportation | Vehicle | Car | Engine and auxiliary equipment AT equipment Fuel line and auxiliary equipment | Gasket, shaft seal, valve stem seal, sealing material, hose Hose, sealing material O (square) ring, tube, packing, core material of valve, hose, sealing material, diaphragm |
|  | Aircraft | Aircraft | Fuel line | Diaphragm, O (square) ring, valve, tube, packing, hose, sealing material |
|  | Rocket | Rocket | Fuel line | Same as above |
|  | Ship | Ship | Fuel line | Same as above |
| Chemical | Chemical products | Plant | Production line of chemicals such as pharmaceutical, agricultural chemical, coating and resin (Petroleum) | Lining, valve, packing, roll, hose, diaphragm, O (square) ring, tube, sealing material |
|  | Chemicals | Pharmaceuticals | Plug for chemicals | Plug for chemicals |
| Mechanical | Photograph | Developing machine | Film developing machine | Roll |
|  |  |  | X-ray film developing machine | Roll |
|  | Printing | Printing machine | Printing roll | Roll |
|  | Coating | Coating facilities | Coating roll | Roll |
|  | Analyzer and physical and chemical appliances |  |  | Tube |
| Food | Plant |  | Food processing line | Lining, valve, packing, roll, hose, diaphragm, O (square) ring, tube, sealing material |
| Metal | Steel making | Steel sheet processing facilities | Steel sheet processing roll | Roll |

TABLE 2

| Industrial field | Basic needs |
|---|---|
| Electric | Plasma resistance, acid resistance, alkali resistance, amine resistance, ozone resistance, gas resistance, chemical resistance, cleanliness, heat resistance |
| Transportation | Heat resistance, amine resistance |
|  | Heat resistance, amine resistance |
|  | Fuel resistance, fuel permeability, heat resistance |
|  | Fuel resistance, fuel permeability, heat resistance |
|  | Fuel resistance, fuel permeability, heat resistance |
|  | Fuel resistance, fuel permeability, heat resistance |
| Chemical | Chemical resistance, solvent resistance, heat resistance |
|  | Chemical resistance, solvent resistance, heat resistance |
|  | Cleanliness |
| Mechanical | Chemical resistance |
|  | Chemical resistance |
|  | Solvent resistance |
|  | Solvent resistance |
| Food | Chemical resistance, solvent resistance, heat resistance |
| Metal | Heat resistance, acid resistance |

TABLE 3

| Industrial field | Specific names |
|---|---|
| Electric | O ring and sealing material for gate valve of product or equipment |
| | O ring and sealing material for quartz window of product or equipment |
| | O ring and sealing material for chamber of product or equipment |
| | O ring and sealing material for gate of product or equipment |
| | O ring and sealing material for bell jar of product or equipment |
| | O ring and sealing material for coupling of product or equipment |
| | O ring and sealing material for pump of product or equipment |
| | O ring and sealing material for gas controller for semiconductor of product or equipment |
| | O ring and sealing material for resist developing and releasing solutions |
| | O ring and sealing material for wafer cleaning solution |
| | Diaphragm of pump for manufacturing equipment |
| | Hose for resist developing solution and releasing solution |
| | Hose and tube for wafer cleaning solution |
| | Roll for transferring wafer |
| | Lining and coating of tanks for resist developing solution and releasing solution |
| | Lining and coating of tanks for wafer cleaning solution |
| | Lining and coating of tanks for wet etching |
| Transportation | Engine head gasket |
| | Metal gasket |
| | Crank shaft seal |
| | Cam shaft seal |
| | Valve stem seal |
| | Manifold packing |
| | Oil hose |
| | ATF hose |
| | Injector O ring |
| | Injector packing |
| | O ring and diaphragm for fuel pump |
| | Fuel hose |
| Mechanics | Developing roll |
| | Developing roll |
| | Gravure roll |
| | Guide roll |
| | Gravure roll for magnetic tape production and coating line |
| | Guide roll for magnetic tape production and coating line |
| | Various coating rolls |

Specifically, the molded articles can be used in the following semiconductor manufacturing equipment.
(1) Etching system
  Dry etching equipment
    Plasma etching machine
    Reactive ion etching machine
    Reactive ion beam etching machine
    Sputter etching machine
    Ion beam etching machine
  Wet etching equipment
  Ashing equipment
(2) Cleaning system
  Dry etching cleaning equipment
    UV/O$_3$ cleaning machine
    Ion beam cleaning machine
    Laser beam cleaning machine
    Plasma cleaning machine
    Gas etching cleaning machine
  Extractive cleaning equipment
    Soxhlet extractive cleaning machine
    High temperature high pressure extractive cleaning machine
    Microwave extractive cleaning machine
    Supercritical extractive cleaning machine
(3) Exposing system
  Stepper
  Coater and developer
(4) Polishing system
  CMP equipment
(5) Film forming system
  CVD equipment
  Sputtering equipment
(6) Diffusion and ion implantation system
  Oxidation and diffusion equipment
  Ion implantation equipment Of these, the present invention exhibits excellent properties as sealing material for equipment in which plasma treatment is conducted, such as CVD equipment, plasma etching machines, reactive ion etching machines, ashing equipment and excimer laser exposing machines.

Particularly, the present invention is excellent as sealing material for equipment in which high-density F radical is generated using NF$_3$ remote plasma in order to clean the inside of the chamber of the CVD machine after the film-forming process by CVD. FIG. 1 briefly depicts CVD equipment using NF$_3$ remote plasma. Another F radical generating machine 1, which generates high-density F radical, is connected to process chamber 2, in which CVD process is conducted, high-density F radical is supplied into chamber 2 and substances attached to the inside of chamber 2 and sealing material 3 are decomposed and removed. In FIG. 1, numerals 4, 5 and 6 respectively represent a massflow adjuster, a pressure controller and a vacuum pump.

Hereinafter, the present invention is explained based on Examples, but the present invention is not limited thereto.

EXAMPLE 1

Deionized water was added to resin (UIP-S) having the following structure to obtain a slurry having a solid content concentration of approximately 20%. Then the resin, which was pulverized by a circulating beads mill to a particular specific surface area and then dried in an electric oven, was cracked by a jet mill to obtain UIP-S having specific surface area of approximately 2 m$^2$/g, diameter of 4 μm and thickness of 1.0 μm.

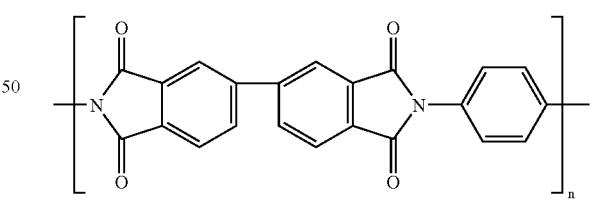

(UIP-S available from Ube Industries, Ltd.: spheres having average particle size of approximately 7 μm, calculated specific surface area is approximately 0.6 m$^2$/g)

A tetrafluoroethylene/perfluoro(methyl vinyl ether) polymer (67% by mol/33% by mol), Perhexa 25B (available from NOF Corporation), triallyl isocyanurate (TAIC) (available from Nippon Kasei Chemical Co., Ltd.) and, as a filler, the UIP-S obtained above having specific surface area of approximately 2 m$^2$/g were mixed in a weight ratio of 100/1/2/15 and then kneaded by an open roll to obtain a crosslinkable fluorine elastomer composition.

The obtained fluorine elastomer composition was crosslinked for 10 minutes at 160° C. and then subjected to oven crosslinking for 4 hours in a 180° C. air oven, to obtain an AS-568A-214 size molded article.

The molded article was subjected to plasma irradiation treatment under the following conditions and the results regarding change in weight before and after irradiation are shown in Table 4.

Also, the 100% tensile stress, tensile strength, elongation and hardness of the molded article were measured respectively according to JIS K 6301 and the results are shown in Table 5.

(1) Test of Resistance to High-Density F Radical Cleaning

Plasma irradiation device: ASTRON fluorine atom generator (made by ASTEX)

$SiO_2$ etching rate: $SiO_2$ etching rate is 1590 Å/min under $NF_3$/argon=500 SCCM/500 SCM, pressure of 5 torr and temperature of 100° C.

Irradiation conditions:

$NF_3$/argon: 1SLM/1SLM

Pressure: 5 torr

Irradiation temperature: 70 to 250° C.

Irradiation time: 2 hours

Weight measurement: Measurement was conducted to 0.01 mg using an electronic analysis scale 2006 MPE made by Sertorious GMBH and the 0.01 mg column was rounded off.

Three samples of each kind were used and the average value of rate of decrease in weight was calculated.

(2) $O_3$ Water Resistance Test

The rubber sealing material was exposed for 4 months under the conditions of $O_3$ gas concentration of 150 to 250 g/m$^3$, temperature of 25° C. and humidity of 100%. After exposure, the weight of the rubber sealing material was measured in the same manner as above and the average value of rate of decrease in weight was calculated.

EXAMPLE 2

The experiment was conducted in the same manner as in Example 1, except that UIP-S having specific surface area of approximately 5 m$^2$/g, diameter of 4 μm and thickness of 0.3 μm, obtained by the same pulverization method as in Example 1, was used.

The molded article was subjected to plasma irradiation treatment under the above conditions and the results regarding change in weight before and after irradiation are shown in Table 4.

Also, the 100% tensile stress, tensile strength, elongation and hardness of the molded article were measured respectively according to JIS K 6301 and the results are shown in Table 5.

EXAMPLE 3

The experiment was conducted in the same manner as in Example 1, except that UIP-S having specific surface area of approximately 10 m$^2$/g, diameter of 3 μm and thickness of 0.15 μm, obtained by the same pulverization method as in Example 1, was used.

The molded article was subjected to plasma irradiation treatment under the above conditions and the results regarding change in weight before and after irradiation are shown in Table 4.

Also, the 100% tensile stress, tensile strength, elongation and hardness of the molded article were measured respectively according to JIS K 6301 and the results are shown in Table 5.

EXAMPLE 4

The experiment was conducted in the same manner as in Example 1, except that UIP-S having specific surface area of approximately 15 m$^2$/g, diameter of 2 μm and thickness of 0.1 μm, obtained by the same pulverization method as in Example 1, was used.

The molded article was subjected to plasma irradiation treatment under the above conditions and the results regarding change in weight before and after irradiation are shown in Table 4.

Also, the 100% tensile stress, tensile strength, elongation and hardness of the molded article were measured respectively according to JIS K 6301 and the results are shown in Table 5.

EXAMPLE 5

The experiment was conducted in the same manner as in Example 1, except that UIP-S was not pulverized.

The molded article was subjected to plasma irradiation treatment under the above conditions and the results regarding change in weight before and after irradiation are shown in Table 4.

Also, the 100% tensile stress, tensile strength, elongation and hardness of the molded article were measured respectively according to JIS K 6301 and the results are shown in Table 5.

EXAMPLE 6

The experiment was conducted in the same manner as in Example 1, except that UIP-S was changed to θ-alumina (AKP-G008, available from Sumitomo Chemical Co., Ltd.).

The molded article was subjected to plasma irradiation treatment under the above conditions and the results regarding change in weight before and after irradiation are shown in Table 4.

Also, the 100% tensile stress, tensile strength, elongation and hardness of the molded article were measured respectively according to JIS K 6301 and the results are shown in Table 5.

EXAMPLE 7

The experiment was conducted in the same manner as in Example 1, except that UIP-S was changed to carbon black (N-990, available from Cancarb Limited).

The molded article was subjected to plasma irradiation treatment under the above conditions and the results regarding change in weight before and after irradiation are shown in Table 4.

Also, the 100% tensile stress, tensile strength, elongation and hardness of the molded article were measured respectively according to JIS K 6301 and the results are shown in Table 5.

EXAMPLE 8

The experiment was conducted in the same manner as in Example 1, except that UIP-S was not used and tetrafluoroethylene/perfluoro(methyl vinyl ether) polymer, Perhexa 25B and TAIC were mixed in a weight ratio of 100/2/1.

The molded article was subjected to plasma irradiation treatment under the above conditions and the results regarding change in weight before and after irradiation are shown in Table 4.

Also, the 100% tensile stress, tensile strength, elongation and hardness of the molded article were measured respectively according to JIS K 6301 and the results are shown in Table 5.

TABLE 4

| | Rate of decrease in weight after high-density F radical irradiation (% by weight) Irradiation temperature 200° C. | Rate of decrease in weight after $O_3$ irradiation (% by weight) |
|---|---|---|
| Ex. 1 | 0.2 | 2.8 |
| Ex. 2 | 0.2 | 2.9 |
| Ex. 3 | 0.2 | 2.8 |
| Ex. 4 | 0.2 | 2.7 |
| Ex. 5 | 0.2 | 2.8 |
| Ex. 6 | 6.9 | 2.6 |
| Ex. 7 | 0.3 | 14.7 |
| Ex. 8 | 0.4 | — |

TABLE 5

| | 100% tensile stress (kgf/cm$^2$) | Tensile strength (kgf/cm$^2$) | Elongation (%) | Hardness (SHORE A) |
|---|---|---|---|---|
| Ex. 1 | 100 | 160 | 170 | 80 |
| Ex. 2 | 130 | 170 | 160 | 80 |
| Ex. 3 | 155 | 185 | 140 | 81 |
| Ex. 4 | 165 | 195 | 120 | 81 |
| Ex. 5 | 60 | 110 | 190 | 79 |
| Ex. 6 | 100 | 240 | 160 | 75 |
| Ex. 7 | 100 | 200 | 180 | 80 |
| Ex. 8 | 30 | 140 | 210 | 65 |

As evident from Table 4, the weight of the composition containing alumina (Ex. 6) decreases significantly by high-density F radical exposure and the weight of the composition containing carbon black (Ex. 7) decreases significantly by $O_3$ treatment. On the other hand, the composition containing the filler of the present invention is found to be extremely stable in weight in both high-density F radical exposure and $O_3$ treatment.

The composition containing UIP-S having specific surface area of approximately 0.6 m$^2$/g of Example 5 was low in decrease in weight by high-density F radical exposure and $O_3$ treatment, but as evident from Table 5, because the particle size was large, 100% tensile stress and tensile strength are poor. On the other hand, in Examples 1 to 4, 100% tensile stress and tensile strength are found to become higher as the specific surface area increases.

EXAMPLE 9

1.2 part by weight of crosslinking agent 6,6'-dianilino-3,3'-[2,2,2-trifluoro-1-(trifluoromethyl)ethylidene]dianiline and 15 parts by weight of aluminum nitride MAN-10 (available from Tokuyama Corp., particle size 200 nm) were added to 100 parts by weight of a fluorine-containing elastomer (TFE/perfluoroalkyl vinyl ether/cyano group-containing monomer=59.4/40.1/0.5 (mol ratio), available from Daikin Industries, Ltd.), and kneaded by an open roll to prepare a crosslinkable fluorine rubber composition.

This fluorine rubber composition was crosslinked by pressing for 10 minutes at 180° C. and then subjected to oven crosslinking for 18 hours in a 290° C. oven, to prepare crosslinked articles of 2 mm thickness and O-ring (AS-568A-214) test samples.

The molded articles were subjected to plasma irradiation treatment under the same conditions as in Examples 1 to 8 and the results regarding change in weight before and after irradiation are shown in Table 6.

Also, the measurement results of vulcanizability, properties under normal conditions, heat resistance and compression set of the molded articles are shown in Table 7.

(Vulcanizability)

The vulcanization curve at 180° C. of each vulcanizable composition was found form JSR-type curastomer II and the minimum viscosity (vmin), the maximum viscosity (vmax), the induction period ($T_{10}$) and the optimum vulcanization time ($T_{90}$) were found.

(Properties Under Normal Conditions)

The 100% modulus, tensile strength and elongation of the vulcanized article of 2 mm thickness under normal conditions (25° C.) were measured according to JIS K6251 and hardness (durometer type A) was measured according to JIS K6253.

(Heat Resistance)

After heating the vulcanized articles for 70 hours at 324° C., the 100% modulus, tensile strength and elongation of the vulcanized article of 2 mm thickness under normal conditions (25° C.) were measured according to JIS K6251 and hardness (durometer type A) was measured according to JIS K6253. Furthermore, the rate of change from properties under normal conditions was calculated.

(Compression Set)

According to JIS K6262, the compression set of the O-ring (AS-568A-214) at 300° C. after 70 hours was measured.

(HF Steel Corrosion Test)

O-ring test pieces were prepared from the various fluorine-containing elastomer compositions described in Examples according to ASTM D 395. The O-rings were press cured in a metal die at 170° C. for 16 minutes, taken out of the die and then post-cured under nitrogen for 10 hours at 305° C. The O-rings were separately placed on a stainless steel 316 plate and heated for 70 hours in a 300° C. air oven. The HF discharged from the O-ring while heating caused corrosion visible to the naked eye (that is black discoloring) on the steel plate. The degree of corrosion of the steel plate was evaluated as 0=no corrosion, 1=some corrosion and 2=severe corrosion (black rings).

EXAMPLE 10

A crosslinkable fluorine rubber composition was prepared by kneading in the same manner as in Example 9, except that 15 parts by weight of silicon nitride SN-E10 (available from Ube Industries, Ltd., particle size 500 nm) was added as nonoxide ceramics powder instead of aluminum nitride MAN-10, and crosslinked articles having 2 mm thickness and O-ring (AS-568A-214 size) test samples were prepared.

The molded articles were subjected to plasma irradiation treatment under the same conditions as in Examples 1 to 8 and the results regarding change in weight before and after irradiation are shown in Table 6.

Also, the measurement results of vulcanizability, properties under normal conditions, heat resistance and compression set of the molded articles are shown in Table 7.

EXAMPLE 11

A crosslinkable fluorine rubber composition was prepared by kneading in the same manner as in Example 9, except that 15 parts by weight of silicon carbide DU A-1 (available from Showa Denko K.K., particle size 450 nm) was added as nonoxide ceramics powder instead of aluminum nitride MAN-10, and crosslinked articles having 2 mm thickness and O-ring (AS-568A-214 size) test samples were prepared.

The molded articles were subjected to plasma irradiation treatment under the same conditions as in Examples 1 to 8 and the results regarding change in weight before and after irradiation are shown in Table 6.

Also, the measurement results of vulcanizability, properties under normal conditions, heat resistance and compression set of the molded articles are shown in Table 7.

EXAMPLE 12

A crosslinkable fluorine rubber composition was prepared by kneading in the same manner as in Example 9, except that 0.8 part by weight of crosslinking agent 6,6'-dianilino-3,3'-[2,2,2-trifluoro-1-(trifluoromethyl)ethylidene]dianiline was added as the crosslinking agent and 20 parts by weight of carbon black (Termax N-990, available from Cancarb Limited, particle size 450 nm) was added instead of the nonoxide ceramics powder, aluminum nitride MAN-10, and crosslinked articles having 2 mm thickness and O-ring (AS-568A-214 size) test samples were prepared.

The molded articles were subjected to plasma irradiation treatment under the same conditions as in Examples 1 to 8 and the results regarding change in weight before and after irradiation are shown in Table 6.

Also, the measurement results of vulcanizability, properties under normal conditions, heat resistance and compression set of the molded articles are shown in Table 7.

EXAMPLE 13

A crosslinkable fluorine rubber composition was prepared by kneading in the same manner as in Example 9, except that 15 parts by weight of silicon dioxide M-7D (available from Cabot Specialty Chemicals Inc., particle size 15 nm) was added instead of the nonoxide ceramics powder, aluminum nitride MAN-10, and crosslinked articles having 2 mm thickness and O-ring (AS-568A-214 size) test samples were prepared.

The molded articles were subjected to plasma irradiation treatment under the same conditions as in Examples 1 to 8 and the results regarding change in weight before and after irradiation are shown in Table 6.

Also, the measurement results of vulcanizability, properties under normal conditions, heat resistance and compression set of the molded articles are shown in Table 7.

EXAMPLE 14

A crosslinkable fluorine rubber composition was prepared by kneading in the same manner as in Example 9, except that 15 parts by weight of α-$Al_2O_3$ AKP-53 (available from Sumitomo Chemical Co., Ltd., particle size 200 nm) was added instead of the nonoxide ceramics powder, aluminum nitride MAN-10, and crosslinked articles having 2 mm thickness and O-ring (AS-568A-214 size) test samples were prepared.

The molded articles were subjected to plasma irradiation treatment under the same conditions as in Examples 1 to 8 and the results regarding change in weight before and after irradiation are shown in Table 6.

Also, the measurement results of vulcanizability, properties under normal conditions, heat resistance and compression set of the molded articles are shown in Table 7.

TABLE 6

| | Rate of decrease in weight after high-density F radical irradiation (% by weight) Irradiation temperature | | Rate of decrease in weight after $O_3$ irradiation |
|---|---|---|---|
| | 200° C. | 300° C. | (% by weight) |
| Ex. 9 | 0.11 | 1.08 | 2.7 |
| Ex. 10 | 0.2 | 0.4 | 2.6 |
| Ex. 11 | 0.2 | 0.42 | 2.6 |
| Ex. 12 | 0.15 | 0.17 | 4.6 |
| Ex. 13 | 0.23 | 0.51 | 2.9 |
| Ex. 14 | 3.21 | 5.66 | 2.6 |

TABLE 7

| Example | 9 | 10 | 11 | 12 | 13 | 14 |
|---|---|---|---|---|---|---|
| Vulcanizability (180° C.) | | | | | | |
| Minimum viscosity (kgf) | 0.70 | 0.51 | 0.42 | 0.53 | 0.30 | 0.61 |
| Maximum viscosity (kgf) | 3.37 | 3.12 | 2.97 | 3.30 | 1.25 | 2.61 |
| Induction time (minutes) | 0.8 | 2.0 | 8.9 | 10.0 | 5.0 | 8.2 |
| Optimum vulcanization time (minutes) | 2.6 | 6.3 | 20.0 | 20.4 | 33.0 | 21.5 |
| Properties under normal conditions | | | | | | |
| 100% modulus (kgf/cm$^2$) | 23 | 30 | 25 | 51 | 50 | 23 |
| Tensile strength (kgf/cm$^2$) | 147 | 131 | 152 | 199 | 136 | 161 |
| Elongation (%) | 335 | 25 | 288 | 273 | 275 | 307 |
| Hardness (IRHD) | 69 | 70 | 67 | 75 | 74 | 66 |
| Heat resistance (324° C. × 70 hours) | | | | | | |
| 100% modulus (kgf/cm$^2$) | 14 | 20 | 17 | 26 | — | 12 |
| Rate of change in weight (%) | −53 | −22 | −48 | −61 | — | −69 |
| Rate of change in elongation (%) | 80 | 62 | 78 | 76 | — | 179 |
| ΔW | −2.2 | −1.8 | −2.3 | −1.4 | — | −2.8 |
| Compression set 300° C. × 70 hours (%) | 42 | 27 | 32 | 38 | — | 45 |
| HF steel corrosion test | 0 | 0 | 0 | 2 | 0 | 1 |

As evident from Table 7, the fluorine containing elastomer composition of the present invention is found to have shorter optimum vulcanization time ($T_{90}$) and to be excellent in processability, in comparison to that in which oxide ceramics are used. Also, in the heat aging test, the rate of change in strength is small and heat resistance is found to improve. With respect to HF trap, corrosion was not observed in Examples 9 to 11 and the system in which $SiO_2$ was used and the compound of the present invention was found to have excellent HF trap function.

EXAMPLE 15

A 3 liter stainless steel autoclave without an ignition source was charged with 1 liter of deionized water, 10 g of

as an emulsifying agent and 0.09 g of disodium hydrogenphosphate-12 $H_2O$ as a pH adjustor. After the system was sufficiently replaced with nitrogen gas to deaerate the system, the autoclave was heated to 50° C. while stirring at 600 rpm. Then, mixed gas of tetrafluoroethylene (TFE) and perfluoro (methyl vinyl ether) (PMVE) (TFE/PMVE=25/75 in mol ratio) was fed so that the inside pressure became 8.0 kgf/$cm^2$G. Subsequently, 10 ml of an aqueous solution of ammonium persulfate (APS) having concentration of 527 mg/ml was injected by nitrogen pressure to initiate the reaction.

When the inside pressure was lowered to 7.0 kgf/$cm^2$G as polymerization progressed, 3 g of $CF_2$=$CFOCF_2CF(CF_3)$$OCF_2CF_2CN$ (CNVE) was injected by nitrogen pressurize. Then, 4.7 g of TFE and 5.3 g of PMVE were respectively injected by their own pressure so that the inside pressure became 8.0 kgf/$cm^2$G. Thereafter, as the reaction progressed, TFE and PMVE were injected in the same manner and increase and decrease in pressure were repeated between 7 to 8 kgf/$cm^2$G. At each of the points when the total amount of TFE and PMVE reached 70 g, 2130 g, 190 g and 250 g, 3 g of CNVE was injected by nitrogen pressure.

19 hours after initiation of the polymerization reaction, when the total amount of TFE and PMVE reached 300 g, the autoclave was cooled and unreacted monomers were discharged to obtain 1330 g of an aqueous dispersion having solid content concentration of 21.2% by weight.

1196 g of the aqueous dispersion was diluted with 3588 g of water and slowly added while stirring to 2800 g of a 3.5% by weight aqueous solution of hydrochloric acid. After the solution was stirred for 5 minutes after adding, the precipitate was filtrated. The obtained polymer was added to 2 kg of HCFC-141b, stirred for 5 minutes and then filtrated again. Thereafter, the steps of cleaning with HCFC-141b and filtrating were repeated four more times and then the polymer was vacuum dried at 60° C. for 72 hours to obtain 240 g of the polymer (elastomer containing a cyano group).

As a result of $^{19}$F-NMR analysis, the monomer unit composition of the elastomer was found to be TFE/PMVE/CNVE=56.6/42.3/1.1% by mol.

The obtained fluorine-containing elastomer (elastomer containing a cyano group having a carboxyl group in the terminal), 2,2-bis(3-amino-4-hydroxyphenyl)hexafluoropropane [bis(aminophenol)AF] and UIP-S were mixed in a weight ratio of 100/3/15 and kneaded with an open roll to prepare a crosslinkable fluorine elastomer composition.

The fluorine elastomer composition was crosslinked for 15 to 25 minutes at 180° C. and then subjected to oven crosslinking for 18 hours in a 290° C. air oven, to prepare an O-ring (AS-568A-214).

The O-ring was subjected to cleaning treatment under irradiation conditions (B: plasma irradiation temperature 200° C.) and (B1: plasma irradiation temperature 300° C.) using fluorine radical generated under conditions (A) and the decrease in weight was examined from the weight before and after irradiation. The results are shown in Table 8.

The fluorine radical generating machine that was used is ASTRON fluorine atom generator AX7657-2 (trade name) made by Applied Science and Technology. Inc.

(Average Primary Particle Size of Aluminum Nitride Filler)

The particle size was calculated according to the following equation from BET specific surface area s ($m^2$/g) found from nitrogen gas adsorption and density of aluminum nitride 3.05 g/$cm^3$. The filler is assumed to be true sphere particles, all having the same size.

Particle size (nm)=$6\times10^3/(3.05\times s)$

EXAMPLE 16

A 3 liter stainless steel autoclave without an ignition source was charged with 1 liter of deionized water, 10 g of

as an emulsifying agent and 0.09 g of disodium hydrogenphosphate-12 $H_2O$ as a pH adjustor. After the system was sufficiently replaced with nitrogen gas to deaerate the system, the autoclave was heated to 50° C. while stirring at 600 rpm. Then, mixed gas of tetrafluoroethylene (TFE) and perfluoro (methyl vinyl ether) (PMVE) (TFE/PMVE=25/75 in mol ratio) was fed so that the inside pressure became 8.0 kgf/$cm^2$G. Subsequently, 10 ml of an aqueous solution of ammonium persulfate (APS) having concentration of 527 mg/ml was injected by nitrogen pressure to initiate the reaction.

When the inside pressure was lowered to 7.0 kgf/$cm^2$G as polymerization progressed, 4.7 g of TFE and 5.3 g of PMVE were respectively injected by their own pressure so that the inside pressure became 8.0 kgf/$cm^2$G. Thereafter, as the reaction progressed, TFE and PMVE were injected in the same manner and increase and decrease in pressure were repeated between 7 to 8 kgf/$cm^2$G.

19 hours after initiation of the polymerization reaction, when the total amount of TFE and PMVE reached 300 g, the autoclave was cooled and unreacted monomers were discharged to obtain 1330 g of an aqueous dispersion having solid content concentration of 21.2% by weight.

1196 g of the aqueous dispersion was diluted with 3588 g of water and slowly added while stirring to 2800 g of a 3.5% by weight aqueous solution of hydrochloric acid. After the solution was stirred for 5 minutes after adding, the precipitate was filtrated. The obtained polymer was added to 2 kg of HCFC-141b, stirred for 5 minutes and then filtrated again. Thereafter, the steps of cleaning with HCFC-141b and filtrating were repeated four more times and then the polymer was vacuum dried at 60° C. for 72 hours to obtain 240 g of the polymer.

As a result of $^{19}$F-NMR analysis, the monomer unit composition of the elastomer was found to be TFE/PMVE=59.2/40.8% by mol.

The obtained fluorine elastomer, an organic peroxide 2,5-dimethyl-2,5-di(t-butylperoxy)hexane (Perhexa 25B (trade name), available from NOF Corporation), a crosslinking accelerator triallyl isocyanurate (TAIC) and aluminum nitride particles (high purity aluminum nitride MAN-20 (trade name), available from Mitsubishi Chemical Corporation; average primary particle size 0.1 μm) were mixed in a weight ratio of 100/1/3/15 and kneaded with an open roll to prepare a crosslinkable fluorine elastomer composition.

The fluorine elastomer composition was crosslinked for 15 to 25 minutes at 160° C. and then subjected to oven crosslinking for 18 hours in 200° C. nitrogen current, to prepare an O-ring (AS-568A-214).

The O-ring was subjected to cleaning treatment under irradiation conditions (B: plasma irradiation temperature 200° C.) and (B1: plasma irradiation temperature 300° C.) using fluorine radical generated under conditions (A) and the decrease in weight was examined from the weight before and after irradiation. The results are shown in Table 8.

EXAMPLE 17

A sample O-ring (AS-568A-214) was prepared in the same manner as in Example 15, except that UIP-S was not used, and decrease in weight under plasma irradiation conditions (B) and (B1) was examined in the same manner as in Example 15. The results are shown in Table 8.

EXAMPLE 18

A sample O-ring (AS-568A-214) was prepared in the same manner as in Example 16, except that aluminum nitride was not added, and decrease in weight under plasma irradiation conditions (B) and (B1) was examined in the same manner as in Example 16. The results are shown in Table 8.

EXAMPLE 19

A sample O-ring (AS-568A-214) was prepared in the same manner as in Example 15, except that α-alumina particles (AKP-50 (trade name) available from Sumitomo Chemical Co., Ltd., average primary particle size 0.1 μm) were used instead of UIP-S in the same amount, and decrease in weight under plasma irradiation conditions (B) and (B1) was examined in the same manner as in Example 15. The results are shown in Table 8.

EXAMPLE 20

A sample O-ring (AS-568A-214) was prepared in the same manner as in Example 16, except that θ-alumina particles (AKP-G008 (trade name) available from Sumitomo Chemical Co., Ltd., average primary particle size 0.03 μm) were used instead of aluminum nitride in the same amount, and decrease in weight under plasma irradiation conditions (B) and (B1) was examined in the same manner as in Example 16. The results are shown in Table 8.

TABLE 8

| | Rate of decrease in weight by high-density F radical (% by weight) Irradiation temperature | |
|---|---|---|
| | 200° C. | 300° C. |
| Ex. 15 | 0.12 | 0.14 |
| Ex. 16 | 0.1 | 1.01 |
| Ex. 17 | 0.14 | 0.15 |
| Ex. 18 | 0.16 | 0.18 |
| Ex. 19 | 0.32 | 1.21 |
| Ex. 20 | 5.13 | 8.53 |

As evident from Table 8, in Examples 19 and 20, decrease in weight by high-density F radical irradiation is large, as UIP-S and aluminum nitride were changed to α-alumina particles and θ-alumina particles. In contrast, in Examples 15 to 18, decrease in weight by high-density F radical irradiation is extremely small when the plasma irradiation temperature is both 200° C. and 300° C.

INDUSTRIAL APPLICABILITY

The present invention provides a crosslinkable elastomer composition, in which generation of HF under high temperature conditions is reduced, the decrease in weight to both $NF_3$ plasma treatment and $O_3$ treatment in the semiconductor manufacturing process is small and generation of foreign substances (particles) in these treatments is suppressed significantly.

The invention claimed is:

1. A crosslinkable elastomer composition comprising (a) a crosslinkable elastomer and (b) a filler having (i) a specific surface area of at least 2 $m^2/g$ and (ii) containing a synthetic polymer having a thermally and chemically stable aromatic ring in the main chain.

2. The crosslinkable elastomer composition of claim 1, wherein said synthetic polymer is a synthetic polymer having an amide bond or an imide bond in the main chain.

3. The crosslinkable elastomer composition of claim 1, wherein said synthetic polymer contains a resin (I) having a repeating unit containing at least one structural unit X represented by

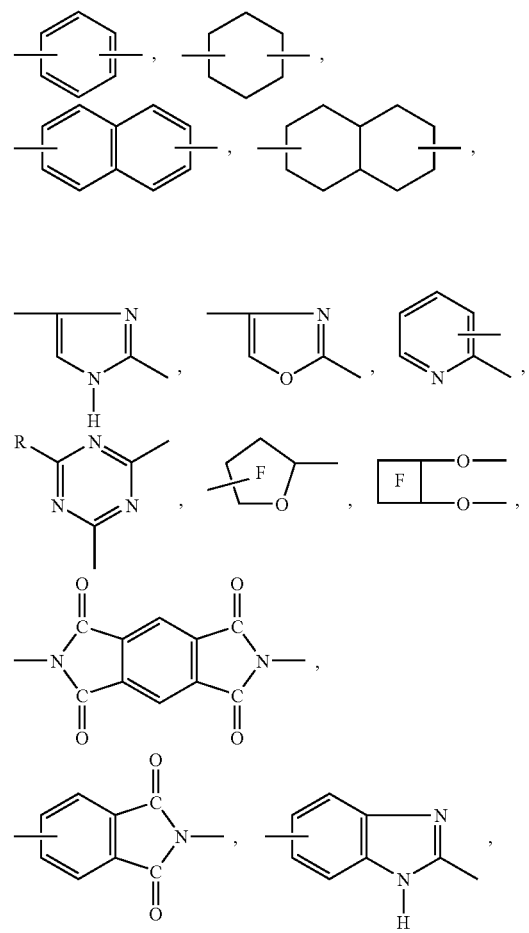

-continued

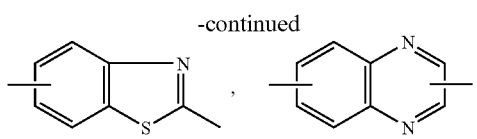

and/or a resin (II) containing at least one each of a repeating unit having at least one structural unit X and a repeating unit having at least one structural unit Y represented by

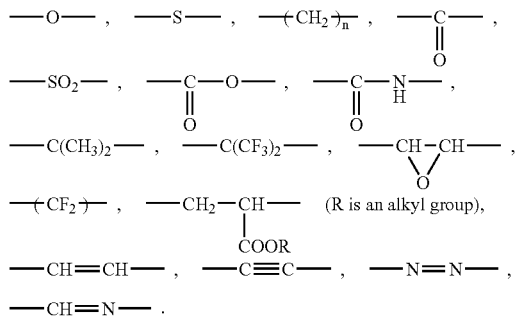

4. The crosslinkable elastomer composition of claim 1, wherein said synthetic polymer contains a resin having at least one of the following repeating units

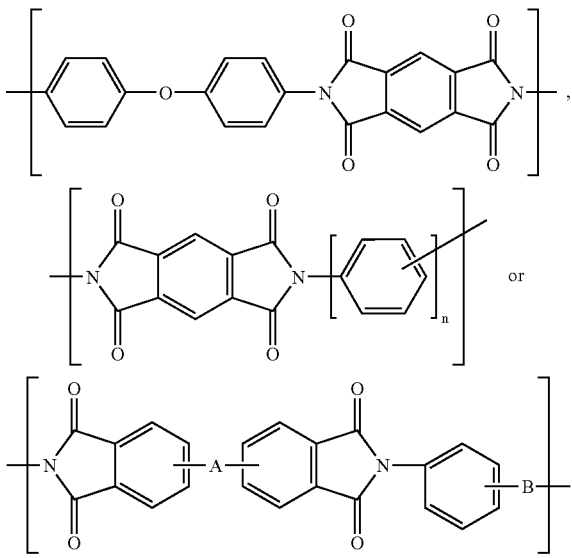

(wherein A is a single bond, —O— or —C(=O)—; B is a single bond, —O—, —S—, —C(=O)—, —CH$_2$— or —C(CF$_3$)$_2$—; n is an integer of 0 to 5).

5. The crosslinkable elastomer composition of claim 1, wherein said synthetic polymer contains a resin having the following repeating unit

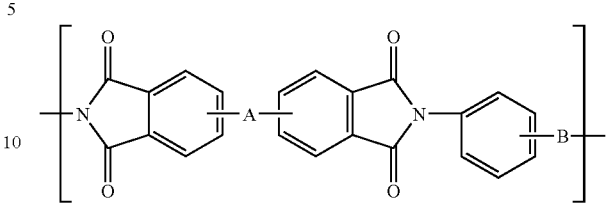

(wherein A is a single bond, —O— or —C(=O)—; B is a single bond, —O—, —S—, —C(=O)—, —CH$_2$— or —C(CF$_3$)$_2$—); n is an integer of 0 to 5).

6. The crosslinkable elastomer composition of claim 1, wherein said crosslinkable elastomer is a fluorine elastomer or a silicone elastomer.

7. The crosslinkable elastomer composition of claim 6, wherein said crosslinkable elastomer is a fluorine-containing elastomer.

8. The crosslinkable elastomer composition of claim 7, wherein said crosslinkable elastomer is a copolymer of tetrafluoroethylene and perfluoro(alkyl vinyl ether).

9. The crosslinkable elastomer composition of claim 8, wherein said crosslinkable elastomer contains a monomer unit containing a crosslinkable reactive group.

10. The crosslinkable elastomer composition of claim 9, wherein said crosslinkable reactive group is an iodine group, a cyano group, a carboxyl group and/or an alkoxycarbonyl group.

11. The crosslinkable elastomer composition of claim 1, wherein 1 to 50 parts by weight of said filler comprising a synthetic polymer is contained based on 100 parts by weight of said crosslinkable elastomer.

12. The crosslinkable elastomer composition of claim 1, which further comprises a crosslinking agent.

13. The crosslinkable elastomer composition of claim 12, wherein said crosslinking agent is a compound having at least two crosslinkable reactive groups represented by formula (14)

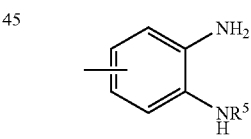

(wherein R$^5$ is a fluorine atom or a monovalent organic group).

14. A molded article comprising the crosslinkable elastomer composition of claim 1.

15. A sealing material comprising the crosslinkable elastomer composition of claim 1.

* * * * *